United States Patent
Iizuka

(10) Patent No.: US 9,790,871 B2
(45) Date of Patent: Oct. 17, 2017

(54) CONTROL APPARATUS FOR VEHICLE, VEHICLE, AND MOTOR

(71) Applicant: YAMAHA HATSUDOKI KABUSHIKI KAISHA, Iwata-shi, Shizuoka (JP)

(72) Inventor: Shinya Iizuka, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 505 days.

(21) Appl. No.: 14/397,497

(22) PCT Filed: Sep. 19, 2012

(86) PCT No.: PCT/JP2012/073960
§ 371 (c)(1),
(2) Date: Oct. 28, 2014

(87) PCT Pub. No.: WO2014/045357
PCT Pub. Date: Mar. 27, 2014

(65) Prior Publication Data
US 2015/0127242 A1 May 7, 2015

(51) Int. Cl.
*F16D 48/02* (2006.01)
*F16D 13/46* (2006.01)
(Continued)

(52) U.S. Cl.
CPC .......... *F02D 31/001* (2013.01); *F16D 13/46* (2013.01); *F16D 48/02* (2013.01); *F16D 48/06* (2013.01);
(Continued)

(58) Field of Classification Search
CPC ..... B60W 10/02; B60W 10/11; F02D 31/001; F02D 2250/18; F16D 13/46; F16D 48/02;
(Continued)

(56) References Cited

U.S. PATENT DOCUMENTS 8,478,495 B2 * 7/2013 Kato ................ B60W 10/06
701/51
2004/0166990 A1 8/2004 Buchanan et al.
(Continued)

FOREIGN PATENT DOCUMENTS

DE   198 57 112 A1   6/1999
EP   1 450 074 A2    8/2004
(Continued)

OTHER PUBLICATIONS

Official Communication issued in corresponding European Patent Application No. 12885088.0, dated Jul. 18, 2016.
(Continued)

*Primary Examiner* — Hieu T Vo
*Assistant Examiner* — Arnold Castro
(74) *Attorney, Agent, or Firm* — Keating and Bennett, LLP

(57) ABSTRACT

A control apparatus of a vehicle obtains information indicating a relationship between an instruction value to be provided to an actuator in accordance with a driving condition of a vehicle and a torque capacity of a clutch. The control apparatus includes a table holding unit that stores a correction table to be applied under a condition when an output torque from the engine is increasing and a correction table to be applied under a condition when an output torque from the engine is decreasing, a gear change condition determining unit that determines under which condition a gear change is executed, and a correction table update unit that updates the correction table to be applied under the determined condition based on the information indicating a relationship between a target value and an actual value of the torque capacity generated at the inertia phase.

11 Claims, 24 Drawing Sheets

(51) Int. Cl.
*F16D 48/06* (2006.01)
*F16H 61/02* (2006.01)
*F02D 31/00* (2006.01)
*F16H 61/688* (2006.01)
*F16H 61/04* (2006.01)

(52) U.S. Cl.
CPC ......... *F16H 61/02* (2013.01); *F16H 61/0437* (2013.01); *F16H 61/688* (2013.01); *F02D 2250/18* (2013.01); *F16D 2500/10412* (2013.01); *F16D 2500/10462* (2013.01); *F16D 2500/1117* (2013.01); *F16D 2500/3067* (2013.01); *F16D 2500/70408* (2013.01); *F16D 2500/70454* (2013.01); *F16H 2061/0459* (2013.01); *F16H 2061/0474* (2013.01)

(58) Field of Classification Search
CPC ............. F16D 48/06; F16D 2500/1086; F16D 2500/1117; F16D 2500/3067; F16D 2500/10412; F16D 2500/10462; F16D 2500/50653; F16D 2500/70408; F16D 2500/70454; F16H 61/02; F16H 61/688; F16H 61/0437; F16H 2061/0459; F16H 2061/0474; Y10T 477/641
USPC ........ 477/70, 79, 166, 174; 701/110, 51, 67, 701/68
See application file for complete search history.

(56) References Cited

U.S. PATENT DOCUMENTS

| | | |
|---|---|---|
| 2004/0166991 A1 | 8/2004 | Buchanan et al. |
| 2004/0166992 A1* | 8/2004 | Buchanan ............... F16D 48/06 477/181 |
| 2004/0172184 A1 | 9/2004 | Vukovich et al. |
| 2004/0192504 A1 | 9/2004 | Kumazawa |
| 2005/0288147 A1* | 12/2005 | Endo ...................... B60K 6/445 477/5 |
| 2006/0234827 A1* | 10/2006 | Sakamoto ............... F16H 3/006 477/30 |
| 2007/0102211 A1 | 5/2007 | Nozaki et al. |
| 2009/0137363 A1 | 5/2009 | Leibbrandt et al. |
| 2010/0063695 A1 | 3/2010 | Sakaue |
| 2010/0261578 A1* | 10/2010 | Fujii ....................... F16H 59/16 477/115 |
| 2013/0289839 A1* | 10/2013 | Iizuka ................. F16H 61/0437 701/54 |
| 2014/0004999 A1 | 1/2014 | Iizuka |
| 2014/0229082 A1* | 8/2014 | Iizuka .................... F02D 41/04 701/54 |
| 2014/0288791 A1* | 9/2014 | Iizuka ................... B60W 10/06 701/54 |
| 2014/0330469 A1* | 11/2014 | Yoshida ................ B60W 10/06 701/22 |

FOREIGN PATENT DOCUMENTS

| | | |
|---|---|---|
| EP | 2 159 440 A1 | 3/2010 |
| EP | 2 208 906 A2 | 7/2010 |
| EP | 2 290 254 A1 | 3/2011 |
| EP | 2 719 913 A1 | 4/2014 |
| JP | 61-124734 A | 6/1986 |
| JP | 05-296337 A | 11/1993 |
| JP | 11-190365 A | 7/1999 |
| JP | 2004-251456 A | 9/2004 |
| JP | 2007-139120 A | 6/2007 |
| JP | 2010-164159 A | 7/2010 |
| WO | 2009/074486 A1 | 6/2009 |
| WO | 2012/120937 A1 | 9/2012 |

OTHER PUBLICATIONS

Official Communication issued in International Patent Application No. PCT/JP2012/073960, dated Nov. 13, 2012.

* cited by examiner

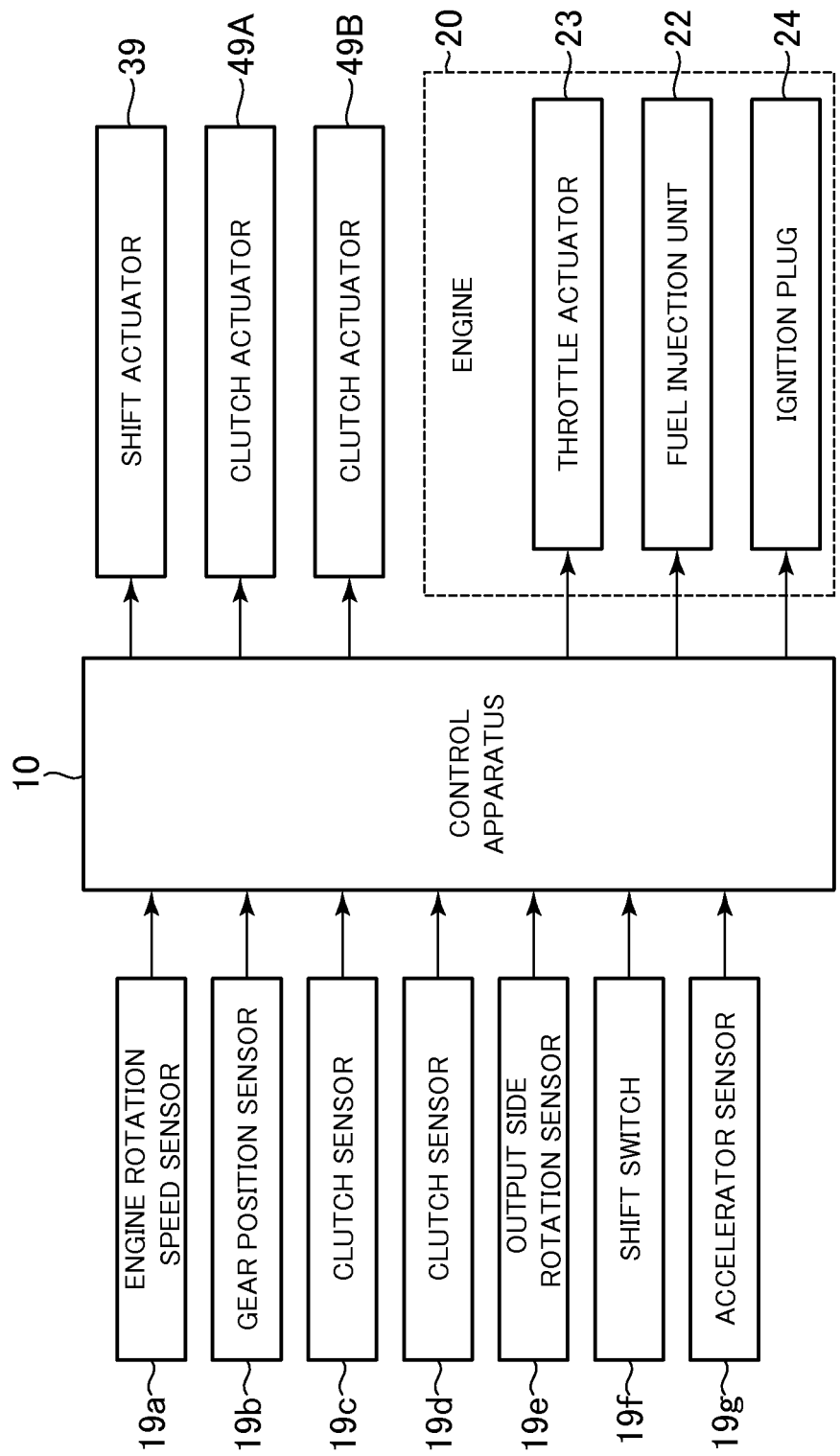

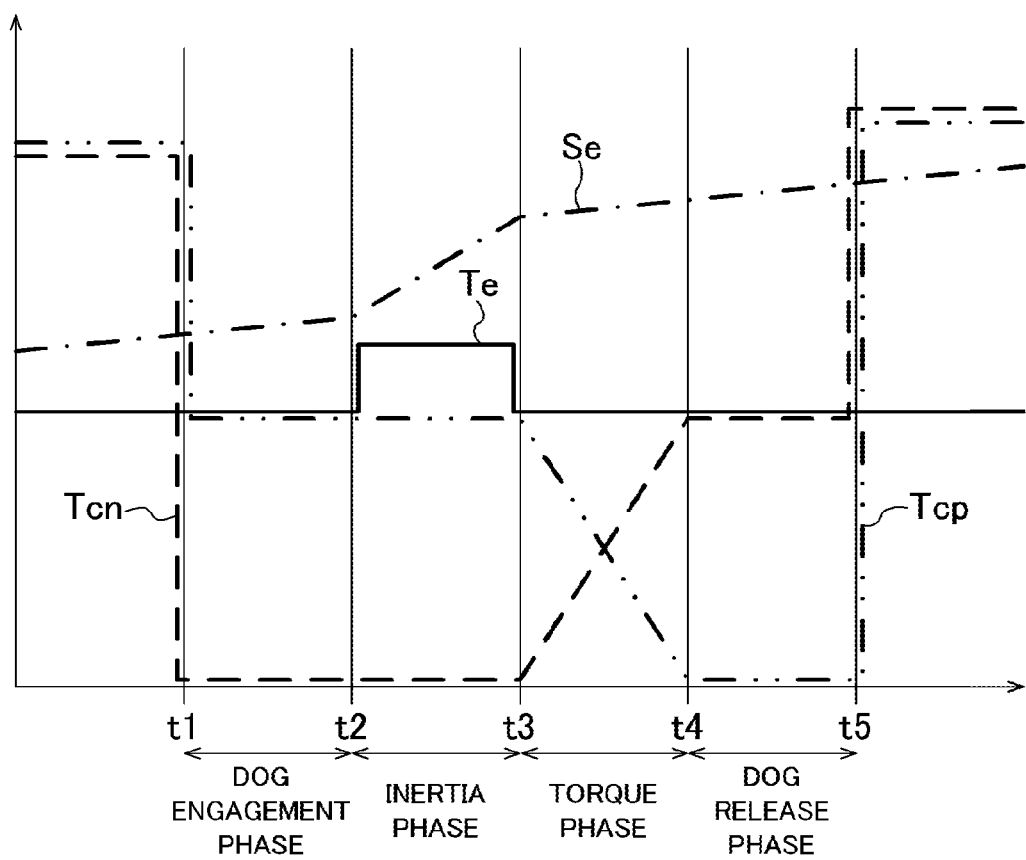

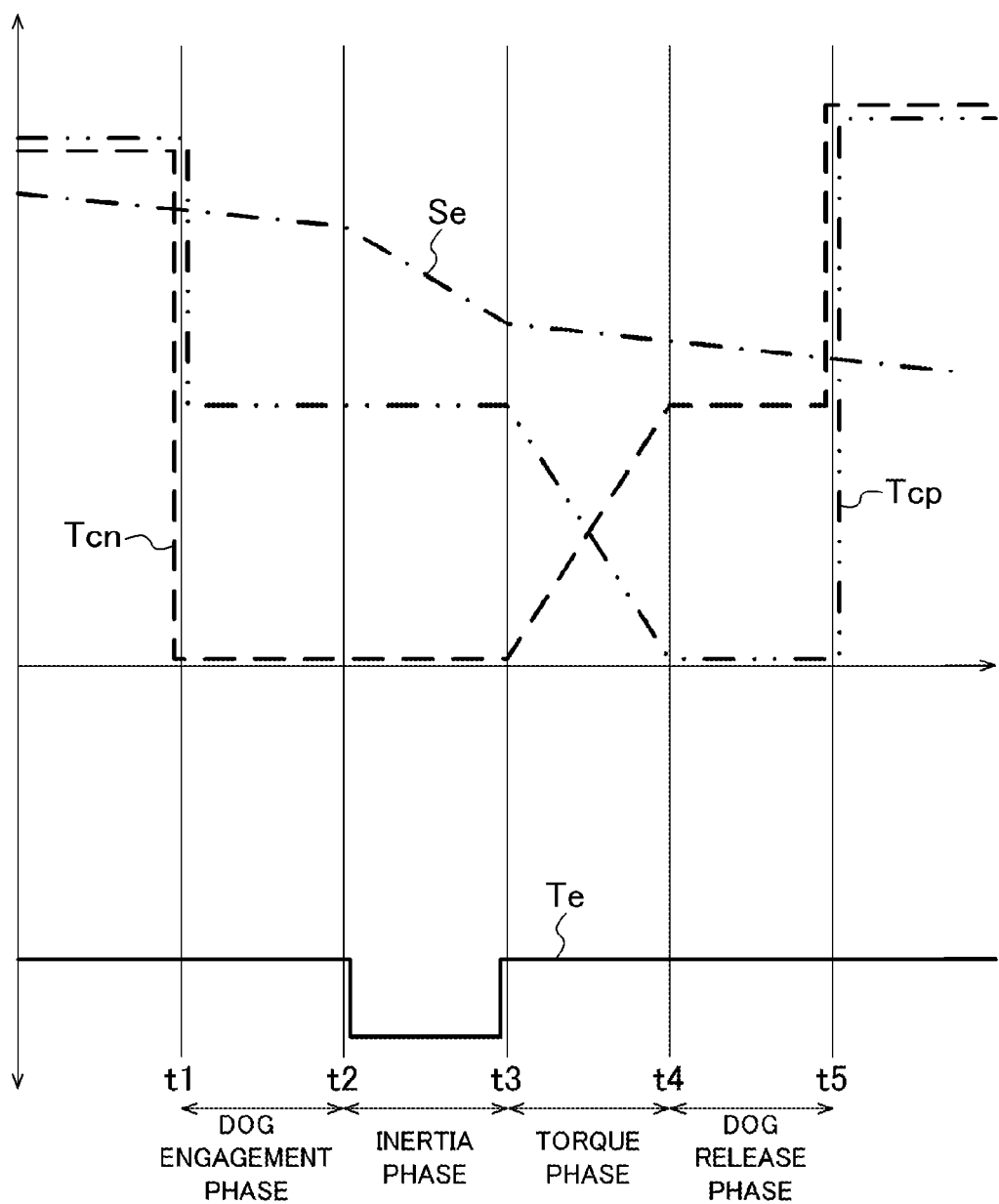

FIG.8

| SHIFT STEP \ ACCELERATOR OPENING DEGREE | 0 | 20 | 40 | 60 | 80 |
|---|---|---|---|---|---|
| 1→2 | 100 | 100 | 100 | 100 | 100 |
| 2→3 | 100 | 100 | 100 | 100 | 100 |
| 3→4 | 100 | 100 | 100 | 100 | 100 |
| 4→5 | 100 | 100 | 100 | 100 | 100 |
| 5→6 | 100 | 100 | 100 | 100 | 100 |

| TORQUE CAPACITY (Nm) | -30 | 0 | 30 | 60 | 90 | 120 | 150 | 180 |
|---|---|---|---|---|---|---|---|---|
| ACTUATOR POSITION VOLTAGE BASE VALUE (V) | 5.0 | 3.0 | 1.5 | 1.3 | 1.1 | 0.9 | 0.7 | 0.5 |

FIG.11

| TORQUE CAPACITY (Nm) | -30 | 0 | 30 | 60 | 90 | 120 | 150 | 180 |
|---|---|---|---|---|---|---|---|---|
| ACTUATOR POSITION VOLTAGE CORRECTION VALUE (V) | 0.0 | -0.3 | -0.1 | 0.2 | 0.6 | 0.4 | 0.1 | 0.3 |

| TORQUE CAPACITY (Nm) | -30 | 0 | 30 | 60 | 90 | 120 | 150 | 180 |
|---|---|---|---|---|---|---|---|---|
| ACTUATOR POSITION VOLTAGE (V) | 5.0 | 3.0 | 1.5 | 1.3 | 1.1 | 0.9 | 0.7 | 0.5 |

| TORQUE CAPACITY (Nm) | -30 | 0 | 30 | 60 | 90 | 120 | 150 | 180 |
|---|---|---|---|---|---|---|---|---|
| PRESSURE PLATE DISPLACEMENT (mm) | 2 | 1.2 | 0.6 | 0.52 | 0.44 | 0.36 | 0.28 | 0.2 |

FIG.21

| PRESSURE PLATE (PP) DISPLACEMENT | CORRECTION VALUE |
|---|---|
| PP>0.1mm | 0.00mm |
| 0.2mm>PP≧0.1mm | 0.12mm |
| ∫ | ∫ |
| 0.7mm>PP≧0.6mm | −0.25mm |
| 0.8mm>PP≧0.7mm | −0.13mm |
| 0.9mm>PP≧1.0mm | −0.04mm |

CONTROL APPARATUS FOR VEHICLE, VEHICLE, AND MOTOR

BACKGROUND OF THE INVENTION

1. Field of the Invention

The present invention relates to a control apparatus for a vehicle, a vehicle, and a motor, and in particular to clutch control during a gear change period.

2. Description of the Related Art

Conventionally, in a vehicle such as a motorcycle or the like, rotation control may be executed to change the rotation speed of the engine by adjusting the torque capacity of a clutch during a gear change period.

Japanese Patent Publication No. 2004-251456 discloses a twin clutch vehicle. In a twin clutch vehicle, two paths each including a clutch and a transmission mechanism are arranged in parallel, and a path for transmitting a torque from the engine is switched from one to another during a gear change period. Japanese Patent Publication No. 2004-251456 describes in paragraphs [0046] to [0063] and shows in FIGS. 8 to 11 that the rotation speed of the engine is changed by adjusting the torque capacity of a clutch during a gear change period.

In a type of a clutch in which an actuator drives a pressure plate, a relationship between an instruction value to be provided to the actuator and a torque capacity generated in the clutch may change as time passes due to a factor such as abrasion of the plate or the like. To address this, in the above-described conventional vehicle, it is necessary to update information, such as a table or the like, indicating a relationship between an instruction value to be provided to an actuator and a torque capacity of a clutch based on a result of rotation control.

However, because a result of rotation control may vary depending on a driving condition of a vehicle, it is possible that the updating information is not very accurate. For example, different characteristics during a change of the rotation speed of the engine may result even though the same torque capacity is generated in the clutch between cases in which the engine output torque is increasing and decreasing, respectively. Further, when the torque capacity of the clutch includes hysteresis, different torque capacities may be generated in the clutch even though the same instruction value is provided to the actuator.

SUMMARY OF THE INVENTION

Preferred embodiments of the present invention have been conceived in view of the above described situation, and provide a control apparatus for a vehicle, a vehicle, and a motor configured to obtain information indicating a relationship between an instruction value to be provided to an actuator in accordance with a driving condition of a vehicle and a clutch torque capacity.

A control apparatus according to a preferred embodiment of the present invention is mounted on a vehicle including, on a path configured to transmit a torque output from an engine, a clutch of which a torque capacity changes in accordance with an operation of an actuator, and a dog clutch transmission mechanism mounted downstream of the clutch. The control apparatus is configured and programmed to execute rotation control to change the rotation speed of the engine in a gear change period by providing an instruction value to the actuator such that the torque capacity of the clutch becomes greater or smaller relative to the torque output from the engine. The control apparatus includes a holding unit, a determining unit, a deciding unit, a control unit, and an update unit. The holding unit is configured and programmed to store condition-specific information indicating a relationship between the torque capacity and the instruction value to be provided to the actuator. The condition-specific information is applied under each of a plurality of driving conditions that lead to different torque capacities generated in the clutch despite a same instruction value given to the actuator or a plurality of driving conditions that lead to different characteristics during a change of the rotation speed of the engine despite a same torque capacity generated in the clutch. The determining unit is configured and programmed to determine under which driving condition among the plurality of driving conditions a gear change is executed. The deciding unit is configured and programmed to decide an instruction value to be provided to the actuator corresponding to a target value of the torque capacity based on the condition-specific information that is applied under the determined driving condition. The control unit is configured and programmed to change the rotation speed of the engine by providing the decided instruction value to the actuator. The update unit is configured and programmed to update the condition-specific information that is applied under the determined driving condition based on information indicating a relationship between a target value and an actual value of the torque capacity that is generated during a period in which the rotation speed of the engine is changed.

A vehicle according to another preferred embodiment of the present invention includes the above described control apparatus.

A motor according to another preferred embodiment of the present invention includes the above described control apparatus.

According to preferred embodiments of the present invention, it is possible to obtain information indicating a relationship between an instruction value given to an actuator in accordance with a driving condition and a clutch torque capacity.

The above and other elements, features, steps, characteristics and advantages of the present invention will become more apparent from the following detailed description of the preferred embodiments with reference to the attached drawings.

BRIEF DESCRIPTION OF DRAWINGS

FIG. 3 is a block diagram showing a structure of the motorcycle.

FIG. 6B is a time chart for explaining an example of a second control mode.

FIG. 6C is a time chart for explaining an example of a third control mode.

FIG. 8 shows an example of the content of a table concerning durations of inertia phases.

FIG. 10 shows an example of the content of a base table.

FIG. 11 shows an example of the content of a correction table.

FIG. 21 shows an example of the content of a table concerning a table learning value.

DETAILED DESCRIPTION OF THE PREFERRED EMBODIMENTS

Preferred embodiments of a control apparatus for a vehicle, a vehicle, and a motor according to the present invention will be described with reference to the drawings.

Figure 1:
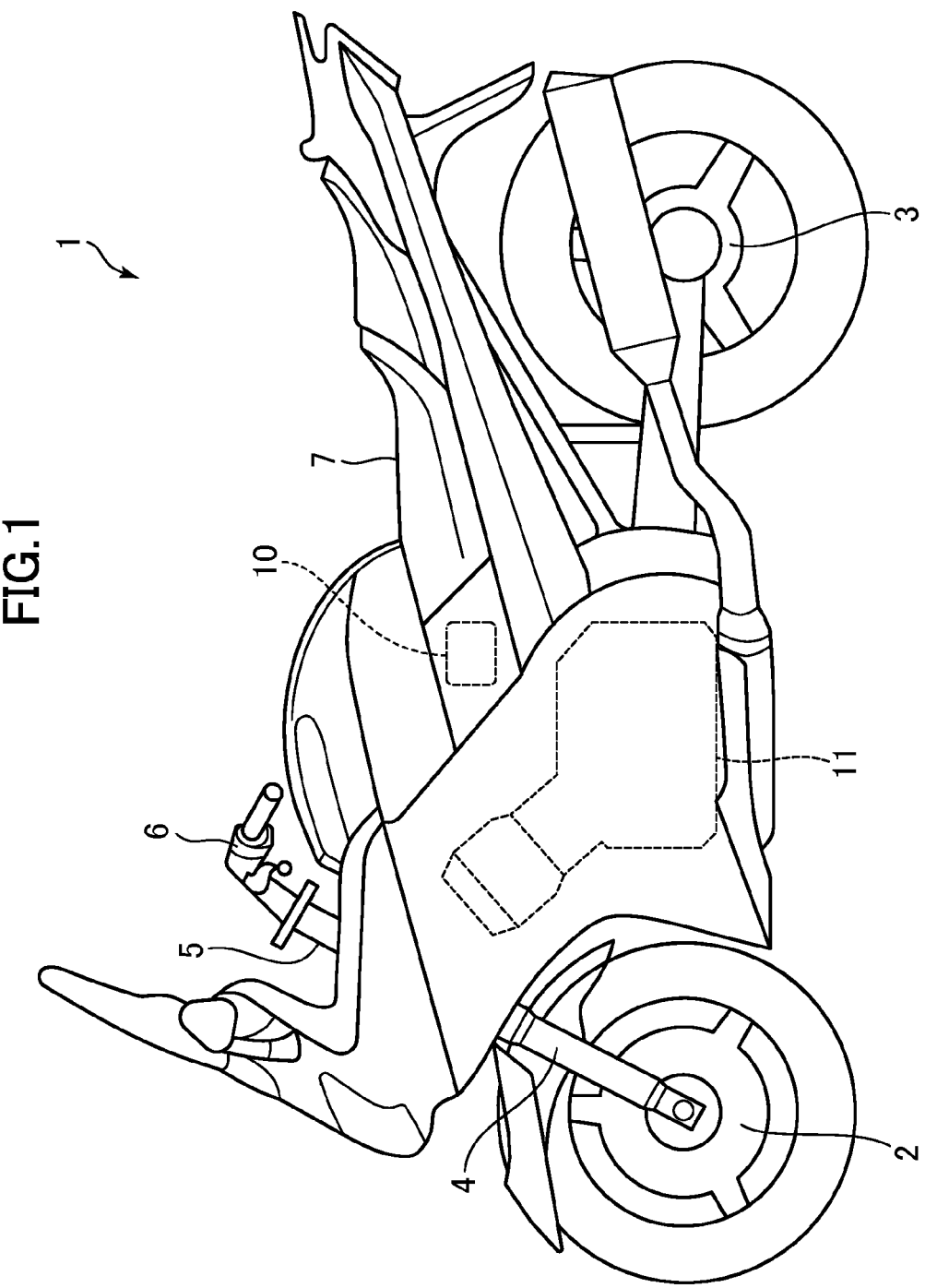
FIG. 1 is a side view of a motorcycle including a control apparatus according to a preferred embodiment of the present invention.
Figure 2:
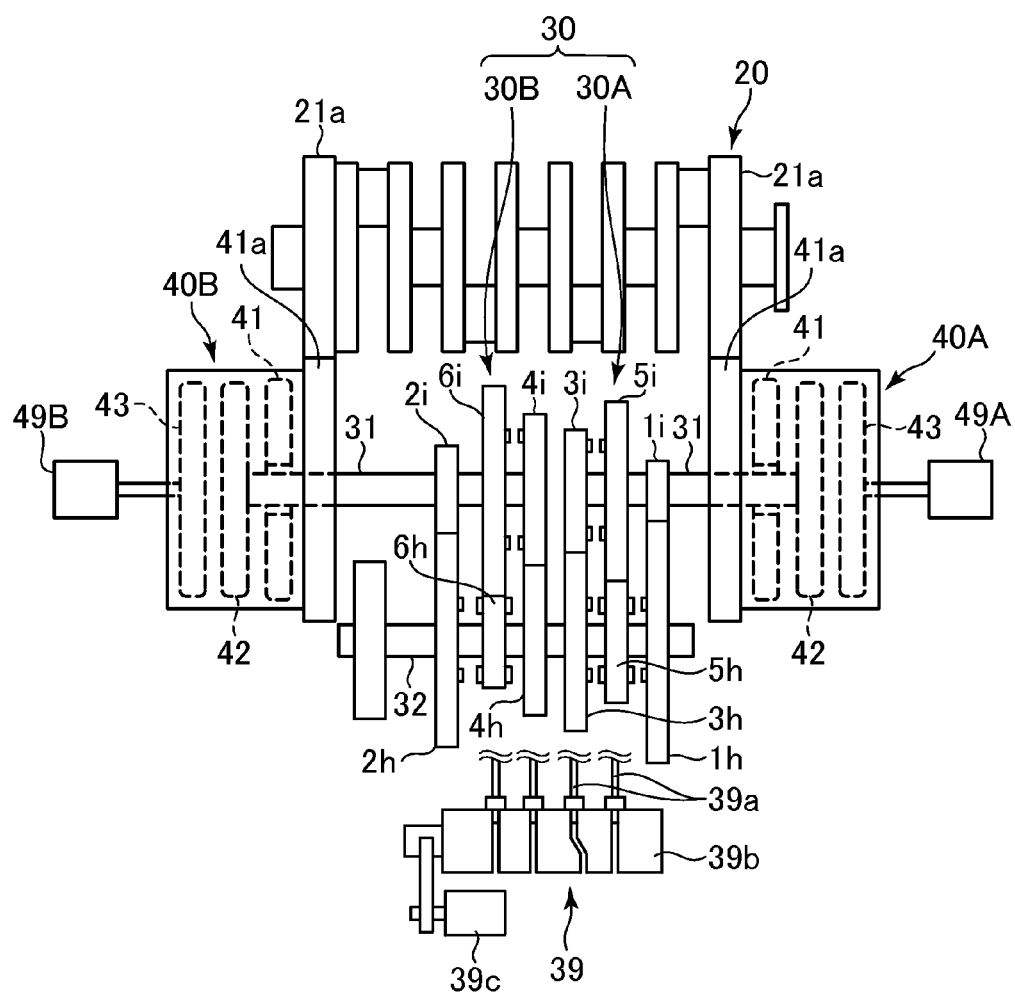
FIG. 2 schematically shows a mechanism provided in a torque transmission path extending from an engine to a rear wheel of the motorcycle.

FIG. 1 is a side view of a motorcycle 1 including a control apparatus 10 according to a preferred embodiment of the present invention. FIG. 2 schematically shows a mechanism provided in a torque transmission path extending from an engine 20 to a rear wheel 3. FIG. 3 is a block diagram showing a structure of the motorcycle 1 according to a preferred embodiment of a vehicle according to the present invention.

As shown in FIG. 1, the motorcycle 1 includes an engine unit 11 according to a preferred embodiment of a motor according to the present invention. A front wheel 2, mounted ahead of the engine unit 11, is supported by the lower end of a front fork 4. A steering shaft 5 which is rotatably supported in the foremost portion of a vehicle body frame (not shown) is connected to the upper portion of the front fork 4. A steering handle 6 is mounted at the top of the steering shaft 5. The steering handle 6, the front fork 4, and the front wheel 2 are integrally rotatable in the left to right direction with the steering shaft 5 as the center.

A seat 7 for a driver to sit on while straddling is mounted behind the steering handle 6. A rear wheel 3 is mounted behind the engine unit 11. A torque output from a transmission 30 (see FIG. 2) is transmitted to the rear wheel 3 by a torque transmitting member (not shown), such as a chain, a belt, a drive shaft, and the like.

As shown in FIG. 2, the engine unit 11 includes the engine 20 and the transmission 30. The motorcycle 1 is a so-called twin clutch type vehicle, and includes a first clutch 40A and a second clutch 40B provided in the engine unit 11. The engine 20 includes a crankshaft 21 that rotates as it is driven by the engine 20.

A torque (the rotation of the crankshaft 21) of the engine 20 is input to the first clutch 40A and the second clutch 40B, respectively. The first clutch 40A and the second clutch 40B each include a driving member 41 that interlinks the rotation of the crankshaft 21. In the example shown in FIG. 2, the crankshaft 21 includes two primary gears 21a. A primary gear 41a is provided in each of the driving member 41 of the first clutch 40A and the driving member 41 of the second clutch 40B. The primary gear 41a is engaged with the primary gear 21a.

The first clutch 40A and the second clutch 40B each include a following member 42 that interlinks an input shaft 31 of a transmission mechanism 30A, 30B to be described below. The first clutch 40A and the second clutch 40B are each a single plate or multi-plate friction clutch, for example. The driving member 41 and the following member 42 are pressed to each other in the shaft direction such that torque is transmitted between them. The driving member 41 is a friction disk, for example, and the following member 42 is a clutch disk, for example.

The transmission 30 includes the first transmission mechanism 30A and the second transmission mechanism 30B. The first transmission mechanism 30A and the second transmission mechanism. 30B are mounted downstream from the first clutch 40A and the second clutch 40B, respectively. That is, the input shafts 31 are provided in each of the first transmission mechanism 30A and the second transmission mechanism 3 OB. The input shaft 31 of the first transmission mechanism 30A is connected to the following member 42 of the first clutch 40A so that torque is input to the first transmission mechanism 30A via the first clutch 40A. Meanwhile, the input shaft 31 of the second transmission mechanism 30B is connected to the following member 42 of the second clutch 40B so that torque is input to the second transmission mechanism 30B via the second clutch 40B. The transmission mechanisms 30A, 30B include a common output shaft 32. As described above, the motorcycle 1 includes two paths as a torque transmission path extending from the crankshaft 21 of the engine 20 to the output shaft 32 of the transmission 30. The first path includes the first transmission mechanism 30A and the first clutch 40A, and the second path includes the second transmission mechanism 30B and the second clutch 40B. The output shaft 32 of the transmission 30 is connected to the axle of the rear wheel 3 via a torque transmission member including a chain, a belt, a shaft, or the like.

The first transmission mechanism 30A and the second transmission mechanism 30B include a plurality of gears $1i$ to $6i$ and $1h$ to $6h$, respectively. The gears $1i$ to $6i$ are mounted on the input shaft 31, and the gears $1h$ to $6h$ are mounted on the output shaft 32. The gears $1i$ and the gear $1h$ are engaged with each other, of which the reduction ratio corresponds to the 1st gear. Similarly, the gears $2i$ to $6i$ are engaged with the respective gears $2h$ to $6h$, of which the reduction ratios correspond to the respective 2nd to 6th gears. In this example, the first transmission mechanism 30A includes the gears $1i$, $3i$, $5i$, $1h$, $3h$, $5h$, corresponding to odd numbered shift steps, while the second transmission mechanism 30B includes the gears $2i$, $4i$, $6i$, $2h$, $4h$, $6h$, corresponding to even numbered shift steps.

Each of the transmission mechanisms 30A, 30B preferably is a so-called sliding selective type transmission mechanism. Either one of the paired gears (for example, the gears 1*i* and 1*h*) corresponding to each shift step is rotatable relative to the shaft on which the gear is mounted. Meanwhile, the other of the paired gears is spline engaged with the shaft on which the gear is mounted so as to integrally rotate with the shaft. In this example, the gears 1*h*, 5*i*, 3*h*, 4*h*, 6*i*, 2*h* are rotatable relative to the respective shafts on which these gears are mounted. While the gears 1*i*, 5*h*, 3*h*, 4*h*, 6*i*, 2*h* are engaged with the respective shafts on which these gears are mounted so as to integrally rotate with the shafts. Thus, at a neutral state (a state with neither shift step is set), the gear pairs (5*i*, 5*h*) and (6*i*, 6*h*) interlock the output shaft 32, and the gear pairs (1*i*, 1*h*), (3*i*, 3*h*), (4*i*, 4*h*), and (2*i*, 2*h*) interlock the input shaft 31.

A gear that interlocks the input shaft 31 and a gear that interlocks the output shaft 32 are positioned adjacent to each other in the shaft direction for relative movement in the shaft direction (movable in an approaching direction and separating direction). Further, the plurality of gears 1*i* to 6*i*, 1*h* to 6*h* include a gear having a dog clutch thereon. A gear that interlocks the input shaft 31 and a gear that interlocks the output shaft 32 engage with each other by the dog clutch. With the engagement of these two gears, rotation (torque) of the input shaft 31 of the first transmission mechanism 30A or the input shaft 31 of the second transmission mechanism 30B is transmitted to the output shaft 32. In the example shown in FIG. 2, the gears 5*h*, 3*i*, 4*i*, 6*h* are movable in the shaft direction.

As shown in FIG. 2, the transmission 30 includes a shift actuator 39 to move the gears, which are movable in the shaft direction, 5*h*, 3*i*, 4*i*, 6*h* (hereinafter referred to as a movable gear) in the shaft direction. The shift actuator 39 includes a plurality of shift forks 39*a* to be hooked on the respective movable gears, a shift cam 39*b* to move by rotating the shift fork 39*a* in the shaft direction, an electric motor 39*c* to generate a driving force to rotate the shift cam 39*b*, and the like. The shift actuator 39 moves a movable gear under the control by the control apparatus 10 to shift the shift steps.

Clutch actuators 49A, 49B are provided to move the clutches 40A, 40B under the control by the control apparatus 10 (that is, to put the clutches 40A, 40B in an engaged state or a released state) are provided. Each of the clutch actuators 49A, 49B includes an electric motor, for example. A driving force of the electric motor is transmitted to a pressure plate 43 by oil pressure or a rod to press the driving member 41 and the following member 42 toward each other in the shaft direction.

As shown in FIG. 3, a fuel injection unit 22, a throttle actuator 23, and an ignition plug 24 are included in the engine 20. The fuel injection unit 22 supplies fuel for combustion in a combustion chamber of the engine 20 to the engine 20. The throttle actuator 23 controls the opening degree of a throttle valve (not shown) to adjust the amount of air flowing in an intake path of the engine 20. The ignition plug 24 ignites the mixture of the fuel and the air flowing in the combustion chamber of the engine 20. The amount of fuel injected by the fuel injection unit 22, an ignition timing by the ignition plug 24, and a throttle valve opening degree (hereinafter referred to as a throttle opening degree) are controlled by the control apparatus 10.

The motorcycle 1 includes an engine rotation speed sensor 19*a*, a gear position sensor 19*b*, clutch sensors 19*c*, 19*d*, an output side rotation sensor 19*e*, a shift switch 19*f*, and an accelerator sensor 19*g*. These sensors are connected to the control apparatus 10.

The engine rotation speed sensor 19*a* includes a rotation sensor to output a pulse signal having a frequency in accordance with the engine rotation speed. The control apparatus 10 calculates the engine rotation speed (the rotation speed of the crankshaft 21) based on an output signal of the engine rotation speed sensor 19*a*.

The gear position sensor 19*b* includes a potentiometer to output a voltage signal in accordance with the rotation angle of the shift cam 39, for example. The control apparatus 10 determines the positions of the movable gears 5*h*, 3*i*, 4*i*, 6*h* and the current shift step based on an output signal from the gear position sensor 19*b*.

The output side rotation sensor 19*e* is mounted on the axle of the rear wheel 3 or the output shaft 32. The output side rotation sensor 19*e* is a rotation sensor configured to output a pulse signal having a frequency in accordance with the rotation speed of the rear wheel 3 or of the output shaft 32, for example. The control apparatus 10 calculates the vehicle speed or the rotation speed of the output shaft 32 based on an output signal from the output side rotation sensor 19*e*.

The shift switch 19*f* is a switch configured to be operated by a driver, and inputs a shift instruction made by the driver (a signal indicating a shift-up instruction to increase the shift step and a signal indicating a shift-down instruction to decrease the shift step) to the control apparatus 10. As the shift switch 19*f*, a shift-up switch and a shift-down switch are both provided.

The accelerator sensor 19*g* outputs a signal in accordance with the amount of operation (a rotation angle) of an accelerator grip (not shown) provided to the steering handle 6. The accelerator sensor 19*g* includes a potentiometer, for example. The control apparatus 10 determines the amount of operation (an accelerator operation amount) of the accelerator grip based on an output signal from the accelerator sensor 19*g*.

The clutch sensor 19*c* is a sensor configured to determine the transmission torque capacity (the maximum torque that can be transmitted by the first clutch 40A in the current state (a current engaged degree)) of the first clutch 40A. Further, the clutch sensor 19*d* is a sensor configured to determine the transmission torque capacity (the maximum torque that can be transmitted by the second clutch 40B in the current state (a current engaged degree)) of the second clutch 40B. The transmission torque capacity is maximized when the clutches 40A, 40B are in an engaged state, and minimized (for example, 0 Nm) when the clutches 40A, 40B are in a released state. Each of the clutch sensors 19*c*, 19*d* determines, for example, a displaced amount of the pressure plate 43.

The transmission torque capacity corresponds to the position (a clutch stroke amount) of the clutch 40A, 40B. Each clutch sensor 19*c*, 19*d* preferably is a potentiometer configured to output a signal in accordance with the position of the clutch 40A, 40B, for example (a signal in accordance with an operation amount of the clutch actuator 49A, 49B). The control apparatus 10 determines the transmission torque capacity based on the clutch position determined based on an output signal from the clutch sensor 19*c*, 19*d*. For example, the control apparatus 10 calculates the transmission torque capacity, based on the clutch position determined, using a map to correlate a clutch position and a transmission torque capacity or a calculation expression.

In a structure in which the clutch actuator 49A, 49B moves the clutch 40A, 40B by oil pressure, the transmistorque capacity corresponds to an oil pressure applied to the clutch 40A, 40B (hereinafter referred to as a clutch pressure). In such a structure, each clutch sensor 19c, 19d may be a hydraulic sensor configured to output a signal in accordance with the clutch pressure. In this case, the control apparatus 10 determines the transmission torque capacity based on the clutch pressure determined based on an output signal from the clutch sensor 19c, 19d. For example, the control apparatus 10 calculates the transmission torque capacity, based on the clutch pressure determined, using a map to correlate a clutch pressure and a transmission torque capacity, or a calculation expression.

Further, the transmission torque capacity corresponds to a force applied from the clutch actuator 49A, 49B to the clutch 40A, 40B (a pressing force applied to the driving member 41 and the following member 42). With the force applied from each clutch actuator 49A, 49B to the respective clutch 40A, 40B, a portion receiving the force (for example, the case of the clutch 40A, 40B, or the like) is deformed. In view of the above, each clutch sensor 19c, 19d is preferably a deformation sensor configured to output a signal in accordance of the amount of deformation of the portion receiving a force from the clutch 40A, 40B. In this case, the control apparatus 10 determines the transmission torque capacity based on the deformation determined based on an output signal from the clutch sensor 19c, 19d. For example, the control apparatus 10 calculates the transmission torque capacity, based on the deformation determined, using a map to correlate a clutch deformation and a transmission torque capacity or a calculation expression.

The control apparatus 10 includes a CPU (Central Processing Unit), and a memory, such as a ROM (Read Only Memory), a RAM (Random Access Memory), and the like. The control apparatus 10 executes in the CPU programs stored in the memory to control the engine 20, the transmission 30, and the clutches 40A, 40B.

Specifically, the control apparatus 10 is configured and programmed to set a target value for the output torque of the engine 20 (hereinafter referred to as a target engine torque), and drive the throttle actuator 23, the fuel injection unit 22, and the ignition plug 24 such that the actual output torque becomes equal to the target engine torque. Further, the control apparatus 10 is configured and programmed to set a target value (hereinafter referred to as a target torque capacity) for the transmission torque capacity of the first clutch 40A and for the transmission torque capacity of the second clutch 40B, and move the clutch actuators 49A, 49B such that the respective actual transmission torque capacities become equal or substantially equal to the respective target torque capacities. Still further, the control apparatus 10 is configured and programmed to move the shift actuator 39 such that each of the first transmission mechanism 30A and the second transmission mechanism 30B sets a shift step in accordance with a shift instruction.

Below, an outline of shift control will be described. In the description below, of the first clutch 40A and the second clutch 40B, a clutch that transmits the torque of the engine 20 before shifting is conducted is referred to as a prior clutch, and the other clutch (that is, a clutch that starts transmission of the torque of the engine 20 in response to a shift instruction) is referred to as a next clutch. Similarly, of the first transmission mechanism 30A and the second transmission mechanism 30B, a transmission mechanism that transmits the torque of the engine 20 before shifting is conducted is referred to as a prior transmission mechanism, and the other transmission mechanism (that is, a transmission mechanism that starts transmission of the torque of the engine 20 in response to a shift instruction) is referred to as a next transmission mechanism.

FIG. 4 explains an outline of the shift control. In the drawing, the transmission mechanisms 30A, 30B and the clutches 40A, 40B shown in FIG. 2 are shown more simplified. Specifically, in this drawing, the clutch Cp represents a prior clutch, and the clutch Cn represents a next clutch. Further, the transmission mechanism Tp represents a prior transmission mechanism, and the transmission mechanism Tn represents a next transmission mechanism. Still further, the gear Gp1 of the prior transmission mechanism Tp represents a movable gear (5h, 3i, 4i, or 6h) that transmits a torque at a previous shift step, and the gear Gp2 represents a stationary gear (1h, 5i, 3h, 4h, 6i, or 2h) that transmits a torque at the previous shift step. Yet further, the gear Gn1 of the next transmission mechanism Tn represents a movable gear that transmits a torque at the next shift step, and the gear Gn2 represents a stationary gear that transmits a torque at the next shift step. In this drawing, for simplification, one gear is shown for each of the movable gears Gp1, Gn1 and one gear is shown for each of the stationary gears Gp2, Gn2. In this drawing, the stationary gears Gp2, Gn2 are fixed to the output shaft 32 (that is, in spline engagement with the output shaft 32) to integrally rotate with the output shaft 32. Meanwhile, the movable gears Gp1, Gn1 freely rotate relative to the output shaft 32. The movable gears Gp1, Gn1 are engaged with the gears Gp3, Gn3, respectively, fixed to the respective input shafts 31, and interlink the rotation of the respective gears Gp3, Gn3 and the respective input shafts 31.

Figure 4A:
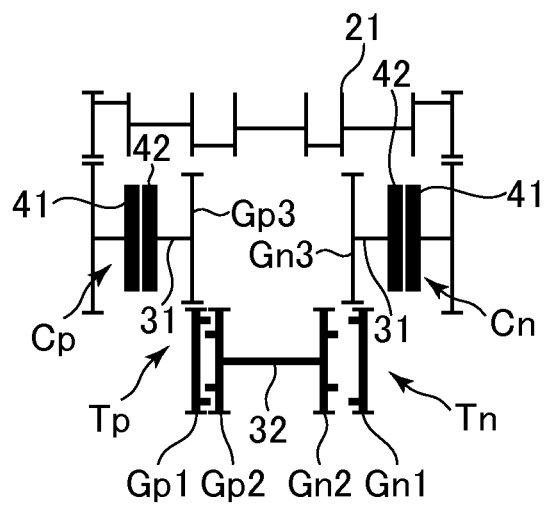
FIGS. 4A to 4D illustrate an outline of shift control.
Figure 4B:
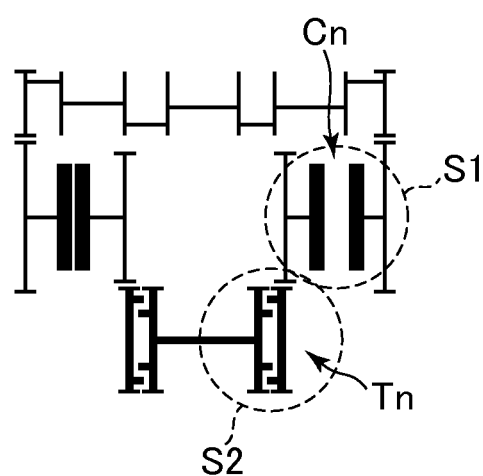
Figure 4C:
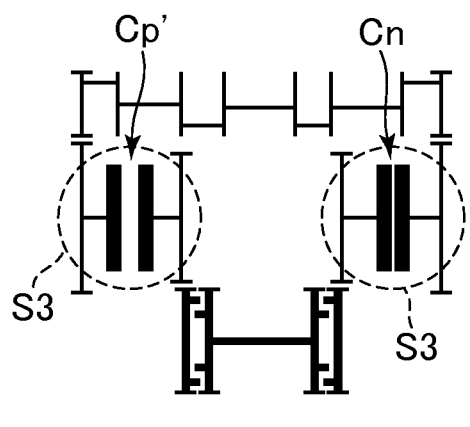
Figure 4D:
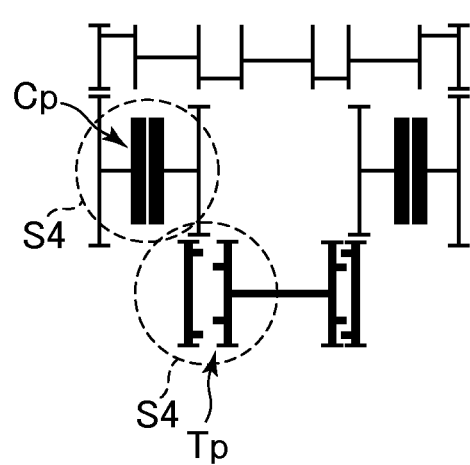

As shown in FIG. 4A, during normal running, the two clutches Cp, Cn are set in an engaged state (a state with the maximum transmission torque capacity). In the prior transmission mechanism Tp, the movable gear Gp1 and the stationary gear Gp2 corresponding to the previous shift step are engaged with each other by the dog clutch. In the next transmission mechanism Tn, all movable gears are placed in a neutral position (a position with no stationary gear engaged). Therefore, the torque of the engine 20 is transmitted to the rear wheel 3 via one of the two torque transmission paths (the prior clutch Cp and the prior transmission mechanism Tp), while torque transmission in the other path is disconnected in the next transmission mechanism Tn.

When a shift instruction is made, the control apparatus 10 switches the paths that transmit a torque from one to the other. That is, the control apparatus 10 causes the movable gear Gn1 and the stationary gear Gn2 of the next transmission mechanism Tn to be engaged with each other, and puts the movable gear Gp1 of the prior transmission mechanism Tp in a neutral position. Specifically, the transmission mechanisms Tp, Tn and the clutches Cp, Cn are moved as described below under shift control. Specifically, the control apparatus 10 initially releases the engagement of the next clutch Cn, as indicated by S1 in FIG. 4B, and then moves the movable gear Gn1 of the next transmission mechanism Tn so as to be engaged with the adjacent stationary gear Gn2 (a so-called dog engagement phase), as indicated by S2. Thereafter, the control apparatus 10 causes the next clutch Cn to return from a released state to an engaged state, as indicated by S3 in FIG. 4C, and also puts the prior clutch Cp in a released state (a so-called torque phase). Finally, the control apparatus 10 moves the movable gear Gp1 of the prior transmission mechanism Tp to a neutral position, as indicated by S4 in FIG. 4D, and then puts the prior clutch Cp in the engaged state (a so-called dog release phase).

During execution of such a shift control, it may be necessary to conduct rotation control (a so-called inertia phase) to have the rotation speed of the driving member 41 of the prior clutch Cp or the next clutch Cn to be equal to that of the following member 42 before or after the torque phase (see S3 in FIG. 4C) in order to prevent an increase and decrease of a driving force of the rear wheel 3 (a shift shock) during shifting. A plurality of control modes for the shift control by the control apparatus 10 to be described below are approximately grouped into ones in which the torque phase precedes the inertia phase, and ones in which the inertia phase precedes the torque phase.

Figure 5:
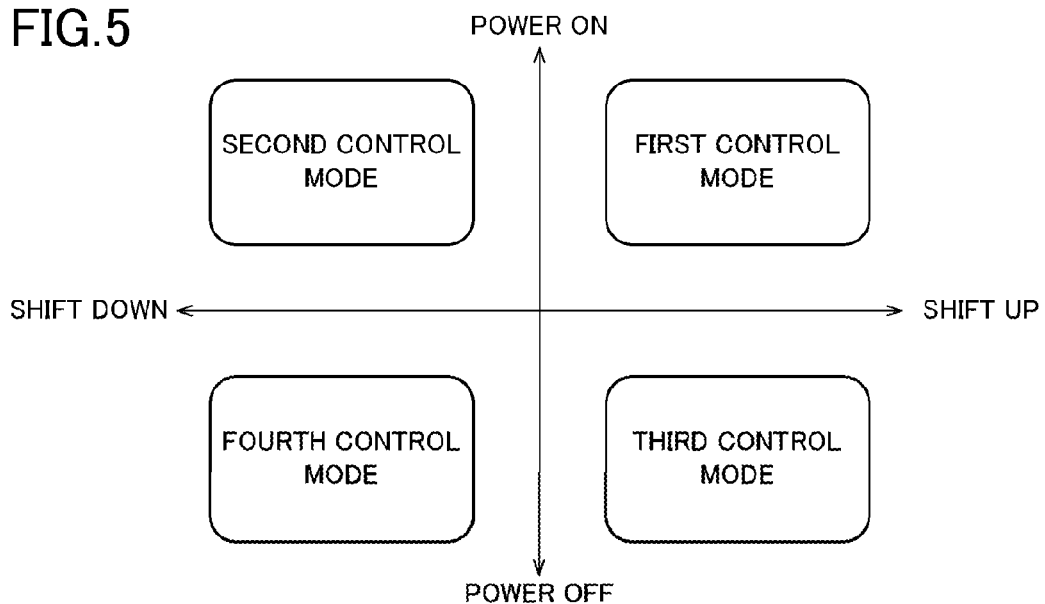
FIG. 5 shows a plurality of control modes for shift control.

FIG. 5 shows the plurality of control modes for shift control by the control apparatus 10. The control apparatus 10 preferably includes four control modes for shift control. The first control mode is for shift up control with the accelerator open (power on shift up control). The second control mode is for shift down control with the accelerator open (power on shift down control). The third control mode is for shift up control with the accelerator closed (power off shift up control). The fourth control mode is for shift down control with the accelerator closed (power off shift down control).

Below, the respective control modes will be described. FIGS. 6A to 6D show time charts for explaining examples of the respective control modes.

First Control Mode

Figure 6A:
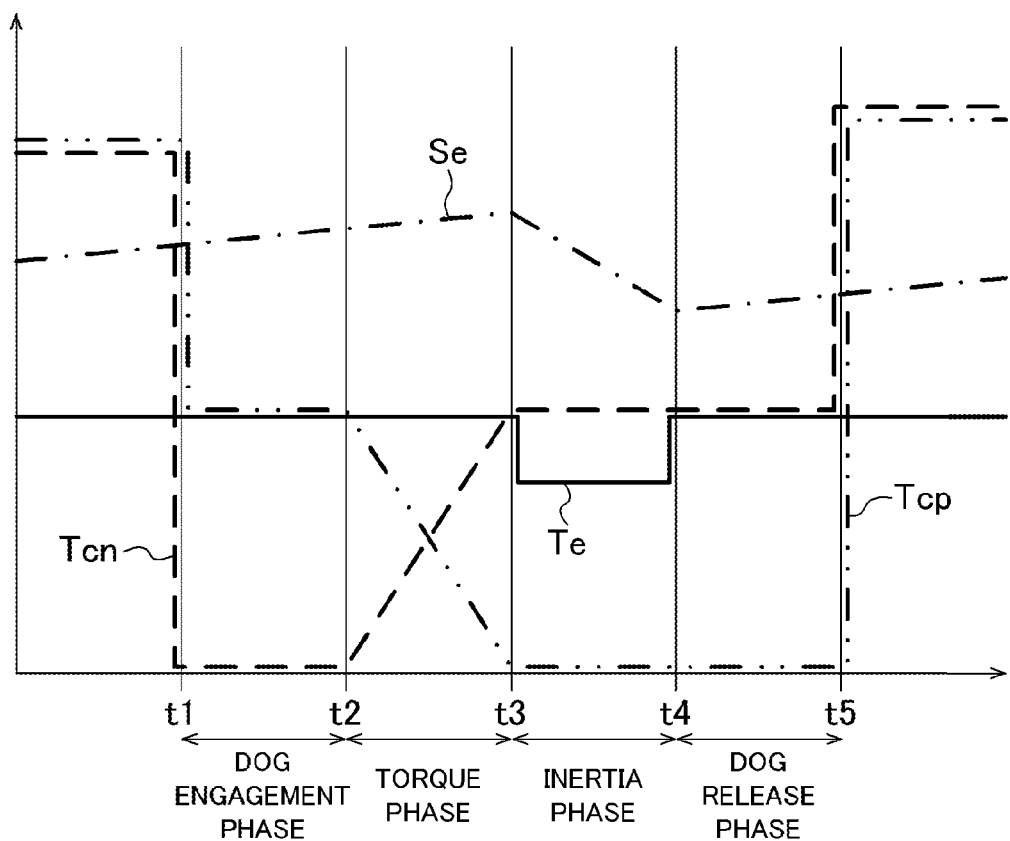
FIG. 6A is a time chart for explaining an example of a first control mode.

FIG. 6A is a time chart for explaining an example of the first control mode (power on shift up control) executed by the control apparatus 10. In the drawing, the alternate long and short dash line indicates the engine rotation speed Se, the solid line indicates the engine torque Te, the broken line indicates the transmission torque capacity Tcn of the next clutch Cn, and the long dashed double-short dashed line indicates the transmission torque capacity Tcp of the prior clutch Cp. Of these, the broken line and the long dashed double-short dashed line each take a value obtained by dividing the transmission torque capacity by a primary reduction ratio. In the drawing, the respective lines are shown displaced from each other in the vertical or horizontal direction so as to avoid overlapping. In the first control mode, the torque phase and the inertia phase are executed in this order.

Initially, the control apparatus 10 starts the dog engagement phase (t1). Specifically, the control apparatus 10 changes the next clutch Cn from the engaged state to the released state. The engaged state refers to a state with the maximum transmission torque capacity, and the released state refers to a state with the minimum transmission torque capacity (for example, 0 Nm). Further, the control apparatus 10 drives the shift actuator 39 to move the movable gear Gn1 of the next transmission mechanism Tn toward the stationary gear Gn2. Still further, the control apparatus 10 changes the prior clutch Cp from the engaged state to a half-engaged state. Here, the transmission torque capacity Tcp of the prior clutch Cp is decreased to a value corresponding to the engine torque Te.

Thereafter, the control apparatus 10 starts the torque phase to switch the paths that transmit the torque of the engine 20 (t2). The control apparatus 10 changes the prior clutch Cp from the half-engaged state to the released state, and changes the next clutch Cn from the released state to the half-engaged state. Specifically, the control apparatus 10 increases the transmission torque capacity Tcp of the next clutch Cn to a value corresponding to the engine torque Te.

Thereafter, the control apparatus 10 starts the inertia phase to decrease the engine rotation speed Se (t3). Specifically, the control apparatus 10 decreases the engine torque Te so as to become relatively lower than the transmission torque capacity Tcn of the next clutch Cn to decrease the engine rotation speed Se. In other words, the control apparatus 10 increases the transmission torque capacity Tcn of the next clutch Cn so as to become relatively higher than the engine torque Te to decrease the engine rotation speed Se.

Thereafter, the control apparatus 10 starts the dog release phase (t4). Specifically, the control apparatus 10 drives the shift actuator 39 to move the movable gear Gp1 of the prior transmission mechanism Tp toward the neutral position. Thereafter, the control apparatus 10 returns the prior clutch Cp and the next clutch Cn to the engaged state (t5). With the above, shift control in the first control mode is finished.

Second Control Mode

FIG. 6B is a time chart for explaining an example of the second control mode (power on shift down control) executed by the control apparatus 10. Below, difference from the above described control mode will be mainly described. In the second control mode, the inertia phase and the torque phase are executed in this order.

The control apparatus 10 starts the inertia phase, following the dog engagement phase, to increase the engine rotation speed Se (t2). Specifically, the control apparatus 10 increases the engine torque Te so as to become relatively higher than the transmission torque capacity Tcp of the prior clutch Cp to increase the engine rotation speed Se. In other words, the control apparatus 10 increases the transmission torque capacity Tcp of the prior clutch Cp so as to become relatively higher than the engine torque Te to increase the engine rotation speed Se. Thereafter, the control apparatus 10 executes the torque phase and the dog release phase. With the above, shift control in the second control mode is finished.

Third Control Mode

FIG. 6C is a time chart for explaining an example of the third control mode (power off shift up control) executed by the control apparatus 10. Below, difference from the above described control modes will be mainly described. In the third control mode, the inertia phase and the torque phase are executed in this order. In the third control mode, the engine torque Te takes a negative value.

The control apparatus 10 starts the inertia phase, following the dog engagement phase, to decrease the engine rotation speed Se (t2). Specifically, the control apparatus 10 increases the absolute value of the engine torque Te so as to become relatively higher than the transmission torque capacity Tcp of the prior clutch Cp (that is, by decreasing the engine torque Te) to decrease the engine rotation speed Se. In other words, the control apparatus 10 decreases the transmission torque capacity Tcp of the prior clutch Cp so as to become relatively lower than the absolute value of the engine torque Te to decrease the engine rotation speed Se. Thereafter, the control apparatus 10 executes the torque phase and the dog release phase. With the above, shift control in the third control mode is finished.

Fourth Control Mode

Figure 6D:
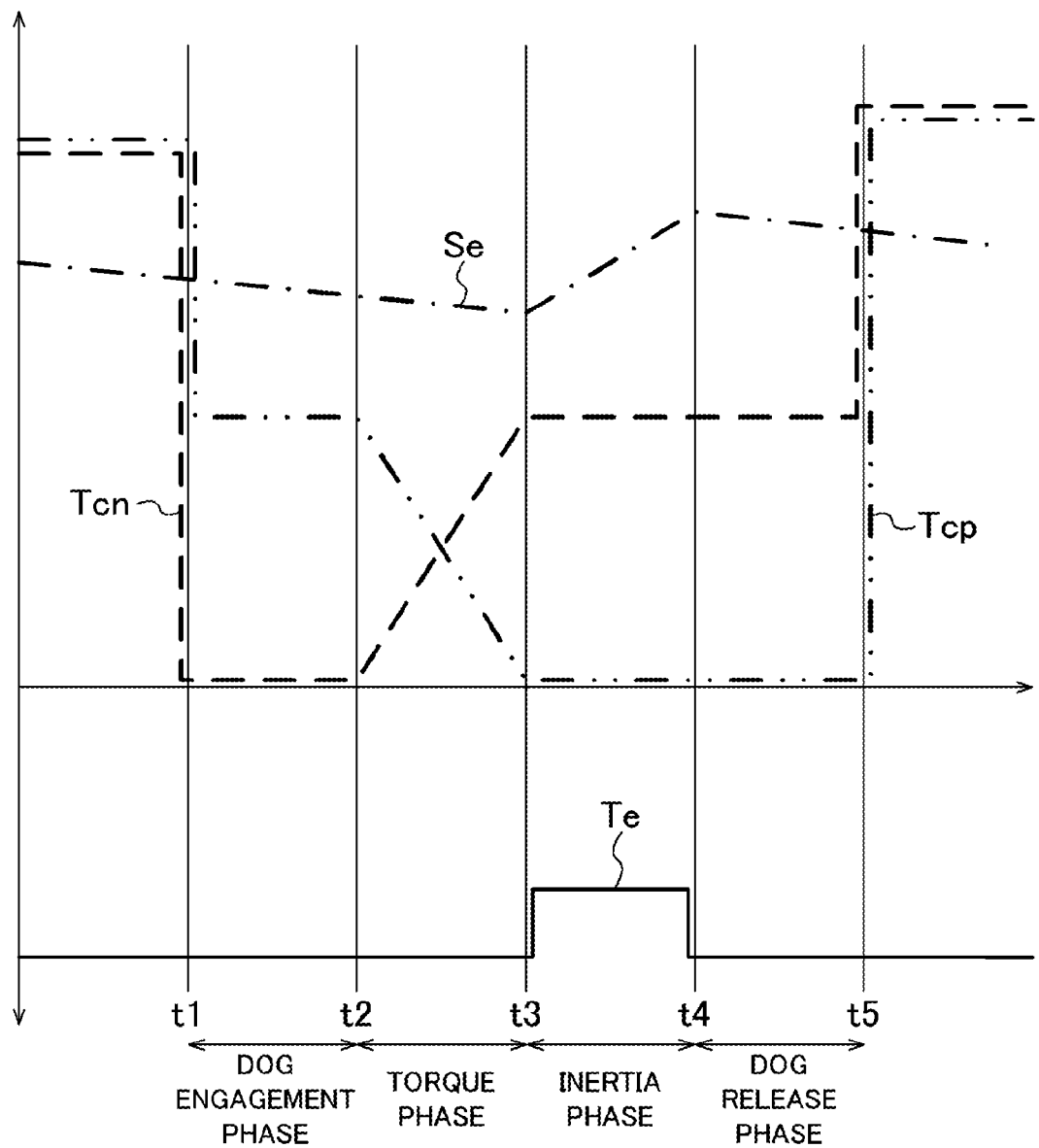
FIG. 6D is a time chart for explaining an example of a fourth control mode.

FIG. 6D is a time chart for explaining an example of the fourth control mode (power off shift down control) executed by the control apparatus 10. Below, difference from the above described control modes will be mainly described. In the fourth control mode, the torque phase and the inertia phase are executed in this order. In the fourth control mode, the engine torque Te takes a negative value.

The control apparatus 10 starts the inertia phase, following the torque phase, to increase the engine rotation speed Se (t3). Specifically, the control apparatus 10 decreases the absolute value of the engine torque Te so as to become relatively lower than the transmission torque capacity Tcn of the next clutch Cn (that is, by increasing the engine torque Te) to increase the engine rotation speed Se. In other words, the control apparatus 10 increases the transmission torque capacity Tcn of the next clutch Cn so as to become relatively higher than the absolute value of the engine torque Te to increase the engine rotation speed Se. Thereafter, the control apparatus 10 executes the dog release phase. With the above, shift control in the fourth control mode is finished.

Figure 7:
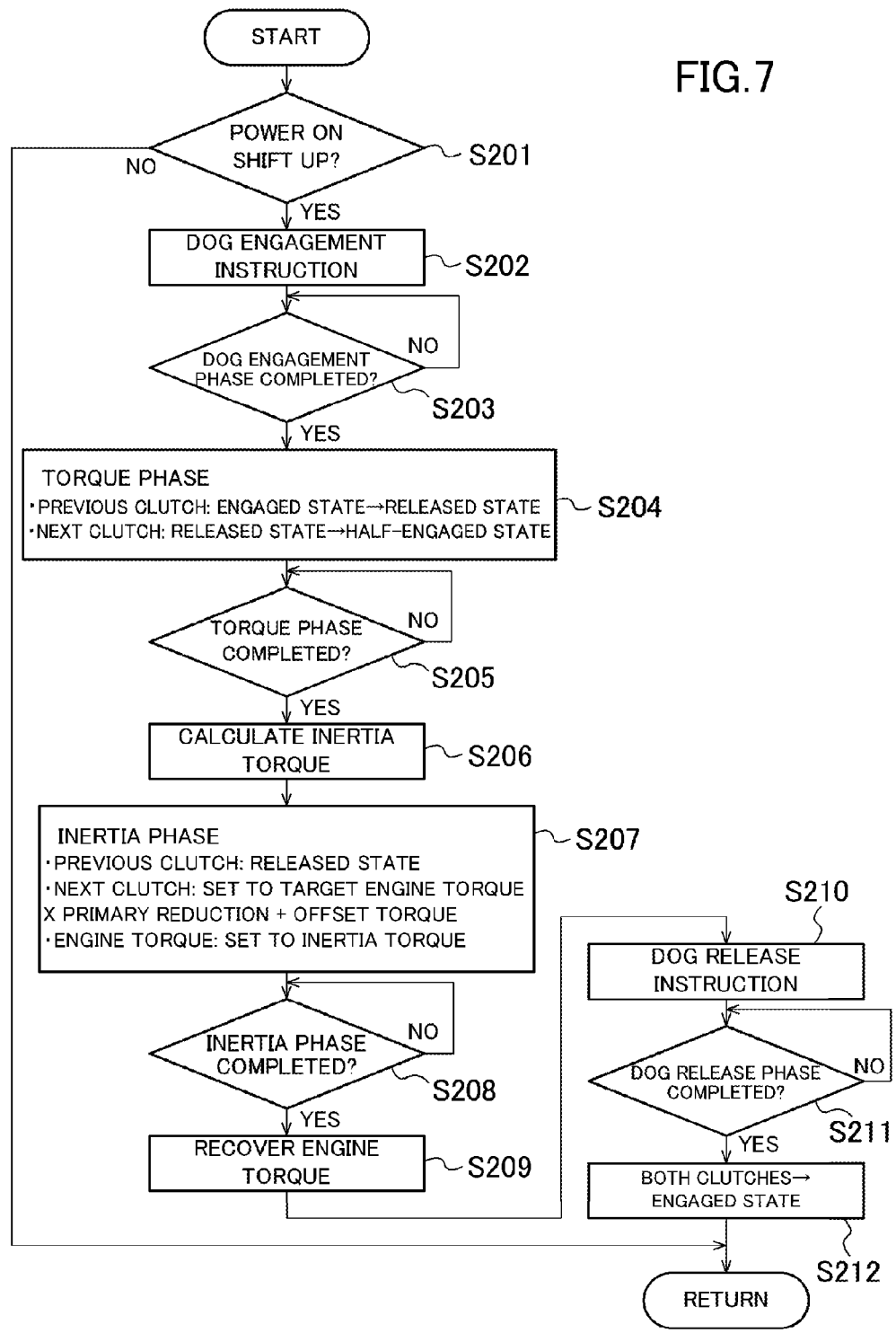
FIG. 7 is a flowchart showing an example of an operation in the first control mode.

Below, as a representative of the first to fourth control modes (FIGS. 6A to 6D), a specific example of an operation in the first control mode (power on shift up control) will be described. FIG. 7 is a flowchart showing an operation example in the first control mode.

At S201, the control apparatus 10 determines whether or not the shift control is in the first control mode (power on shift up control). When the shift control is not in the first control mode (S201: NO), the control apparatus 10 finishes the processing.

At S202, the control apparatus 10 outputs a dog engagement instruction to execute the dog engagement phase (t1 in FIG. 6A). A dog engagement instruction includes an instruction to change the next clutch Cn from the engaged state to the released state and an instruction to move the movable gear Gn1 of the next transmission mechanism Tn toward the stationary gear Gn2. A dog engagement instruction further includes an instruction to change the prior clutch Cp from the engaged state to the half-engaged state. Specifically, the target torque capacity of the prior clutch Cp is set such that a value obtained by dividing it by a primary reduction ratio becomes equal to the target engine torque.

At S203, the control apparatus 10 determines whether or not the dog engagement phase has been completed. As a determination method, the following method is available. For example, when it is determined, based on a signal from the gear position sensor 19b, that the shift cam 39b is positioned within a range corresponding to a dog engagement, it is determined that the dog engagement phase has been completed. Further, in a structure in which a sensor configured to determine the rotation speed of the input shaft 32 is provided, completion of the dog engagement phase preferably is determined when the difference between a value obtained by dividing the engine rotation speed by a primary reduction ratio and the input shaft rotation speed is included in a range corresponding to dog engagement.

At S204, the control apparatus 10 executes the torque phase (t2 in FIG. 6A). At the start of the torque phase, the control apparatus 10 outputs an instruction to change the prior clutch Cp to the released state and an instruction to change the next clutch Cn to the half-engaged state. Specifically, the target torque capacity of the next clutch Cn is set such that a value obtained by dividing the target torque capacity by a primary reduction ratio becomes equal to the target engine torque.

At S205, the control apparatus 10 determines whether or not the torque phase has been completed. Specifically, whether or not the transmission torque capacities of the clutches 40A, 40B have reached the respective target torque capacities is determined based on the signals from the respective clutch sensors 19c, 19d.

At S206, the control apparatus 10 calculates an inertia torque. An inertia torque is a target engine torque applied at the inertia phase (Te in FIG. 6A). An inertia torque is obtained, using, for example, an expression of (current engine rotation speed−engine rotation speed after shifting)/ inertia phase duration×inertia around crank. An inertia phase duration is read from a table, such as shown in FIG. 8, for example, to correlate an inertia phase duration, a shift step, and an accelerator opening degree. Further, an inertia around the crank is an inertia due to an object present around the crank shaft 21, and is obtained in advance at the stage of designing the engine 20, or the like.

At S207, the control apparatus 10 executes the inertia phase to decrease the engine rotation speed Se (t3 in FIG. 6A). With the inertia phase started, the target engine torque is set to the inertia torque calculated at S206. Further, the target transmission torque of the prior clutch Cp is set to the minimum value (for example, 0 Nm). Still further, the target transmission torque of the next clutch Cn is set to a value obtained by multiplying the target engine torque determined based on the accelerator opening degree by a primary reduction ratio and then adding an offset torque. Note here that an offset torque takes a value for addressing a situation in which the inertial phase does not progress as the target transmission torque of the next clutch Cn differs from the actual transmission torque capacity Tcn, being, for example, a value determined in accordance with a period of time elapsed after the start of S207, for example.

At S208, the control apparatus 10 determines whether or not the inertia phase has been completed. For example, it is determined that the inertia phase has been completed when |drive shaft rotation speed×gear ratio after shifting×primary reduction ratio−engine rotation speed|<threshold is satisfied. Further, when the expression, for example, (drive shaft rotation speed×gear ratio before shifting×primary reduction ratio−engine rotation speed)/(drive shaft rotation speed× (gear ratio before shifting−gear ratio after shifting)×primary reduction ratio)>threshold is satisfied, completion of the inertia phase is determined. Still further, completion of the inertial phase is determined when one or both of the above mentioned expressions is/are and programmed.

At S209, the control apparatus 10 returns the target engine torque to a normal value obtained based on the accelerator opening degree.

At S210, the control apparatus 10 outputs a dog release instruction to execute the dog release phase (t4 in FIG. 6A). A dog release instruction includes an instruction to move the movable gear Gn1 of the prior transmission mechanism Tp to the neutral position.

At S211, the control apparatus 10 determines whether or not the dog release phase has been completed. As a determination method, the following method is available. For example, when it is determined, based on a signal from the gear position sensor 19b, that the shift cam 39b is positioned in a range corresponding to dog release, completion of the dog release phase is determined. Further, in a structure in which a sensor configured to determine the rotation speed of the input shaft 32 is provided, completion of the dog release phase is determined when the difference between a value obtained by dividing the engine rotation speed by a primary reduction ratio and the input shaft rotation speed is in a range corresponding to dog release.

At S212, the control apparatus 10 outputs an instruction to change the prior clutch Cp and the next clutch Cn to the engaged state. With the above, shift control in the first control mode (power on shift up control) is finished.

Note here that, in the clutch 40A, 40B, a relationship between an instruction value to be provided to the clutch actuator 49A, 49B and a transmission torque capacity generated in the first clutch 40A and the second clutch 40B may change as time passes due to factors, such as abrasion of the plate, or the like. In view of the above, the control apparatus 10 learns a relationship between an instruction value to be provided to the clutch actuator 49A, 49B and a transmission torque capacity generated in the first clutch 40A and the second clutch 40B based on a result of the inertia phase, as to be described below.

Figure 9:
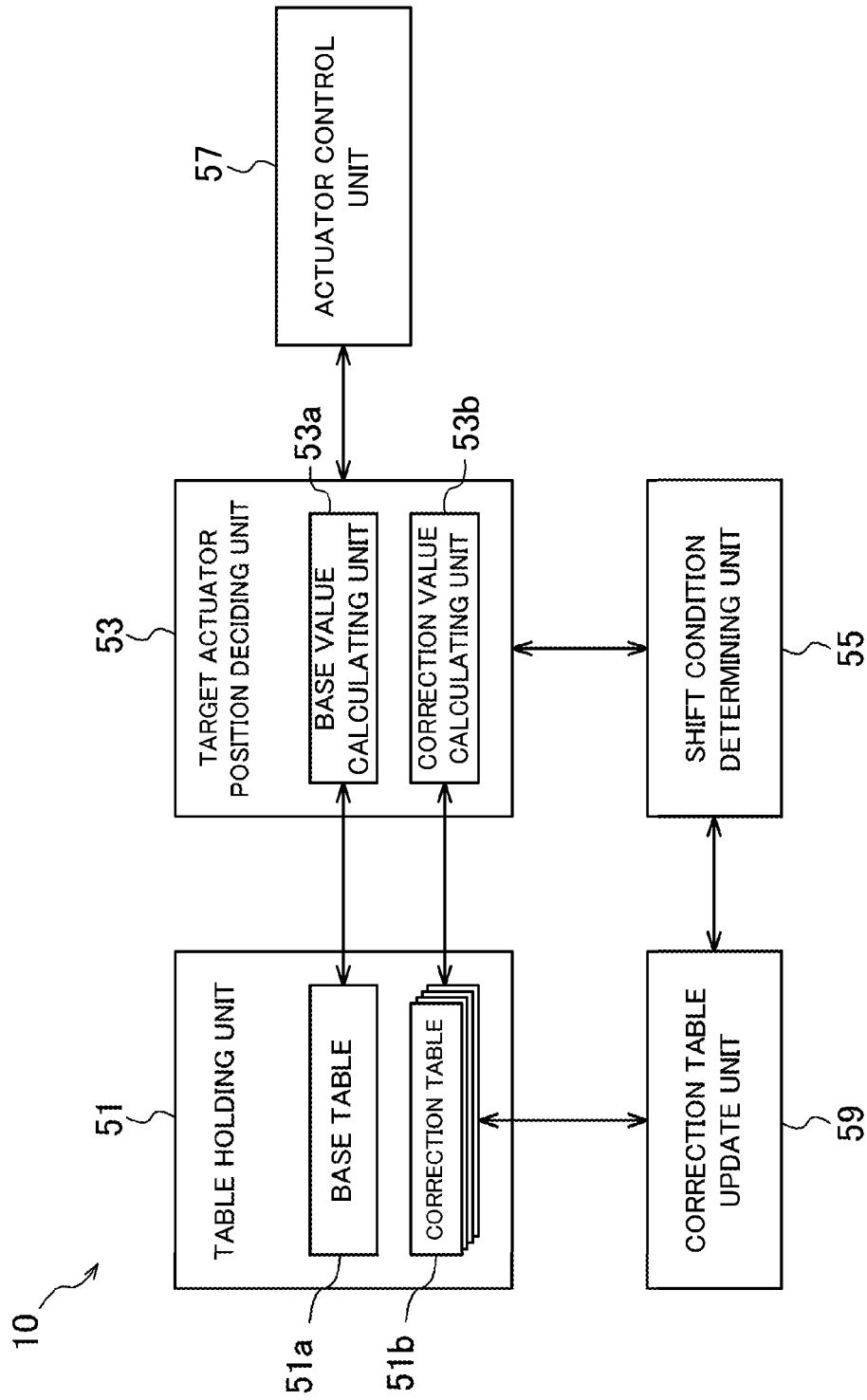
FIG. 9 is a block diagram showing an example of a functional structure of a control apparatus.

FIG. 9 is a block diagram showing a functional structural example of the control apparatus 10. FIG. 9 mainly shows a portion relevant to a function to decide a target actuator position and a portion relevant to a function to learn a relationship between a target actuator position and a transmission torque capacity actually generated among the functions implemented by the control apparatus 10. The control apparatus 10 includes a table holding unit 51, a target actuator position deciding unit 53, a shift condition determining unit 55, an actuator control unit 57, and a correction table update unit 59. The target actuator position deciding unit 53 includes a base value calculating unit 53a and a correction value calculating unit 53b. The respective units included in the control apparatus 10 are implemented by the CPU of the control apparatus 10 by executing a program or programs stored in the memory.

The table holding unit 51 holds a base table 51a and a plurality of correction tables 51b. The base table 51a shows a transmission torque capacity (a target torque capacity) to be generated in the clutch 40A, 40B and a base value of a target actuator position voltage to be provided to the actuator 49A, 49B for the generated transmission torque capacity. FIG. 10 shows an example of the content of the base table 51a.

Meanwhile, the correction table 51b shows a correction value to correct the base value shown in the base table 51a. The correction value is updated by the correction table update unit 59 based on a result of the inertia phase. The base value shown in the base table 51a is added to the correction value shown in the correction table 51b so that the resultant added value makes a target actuator position voltage. With the above, a transmission torque capacity actually generated in the clutch 40A, 40B comes closer to the target torque capacity. Specifically, a target torque capacity and a correction value for a target actuator position voltage are shown in the correction table 51b. FIG. 11 shows an example of the content of the correction table 51b.

In the correction table update unit 59, a plurality of correction tables 51b are stored. This is to address a case in which a result of the inertia phase may be different depending on a driving condition of the motorcycle 1, which resultantly makes accuracy in learning of a correction value for a target actuator position voltage not very high.

For example, characteristics in the change of the rotation speed of the engine may be different between cases in which the engine torque is increasing and decreasing, respectively, even though the same transmission torque capacity is generated in the clutch 40A, 40B. That is, as increase of the engine torque is achieved through throttle control, the engine rotation speed responds relatively slowly. Meanwhile, as a decrease of the engine torque is achieved through ignition retard angle control, the engine rotation speed responds relatively quickly. Accordingly, a rate of change of the rotation speed of the engine at the inertia phase may be different between cases in which the engine torque is increasing and decreasing, respectively, and resultantly, a correction value for the target actuator position voltage, calculated based on a result of the inertia phase, may possibly result in differences.

In a case where the transmission torque capacity of the clutch 40A, 40B includes hysteresis, different transmission torque capacities may be actually generated in the clutch 40A, 40B although the same instruction value is provided to the clutch actuator 49A, 49B. Therefore, it is possible that a correction value for the target actuator position voltage, calculated based on a result of the inertia phase, may result in differences when the clutch 40A, 40B is operated differently during a period in which shift control is executed.

In view of the above, a correction table 51b is prepared with respect to each of a plurality of driving conditions that possibly lead to different results of the inertia phase, so that a different correction table 51b for using and updating a correction value for the target actuator position voltage is used depending on the driving condition. In the following, an operation example of the control apparatus 10 will be described.

First Operation Example

Figure 12:
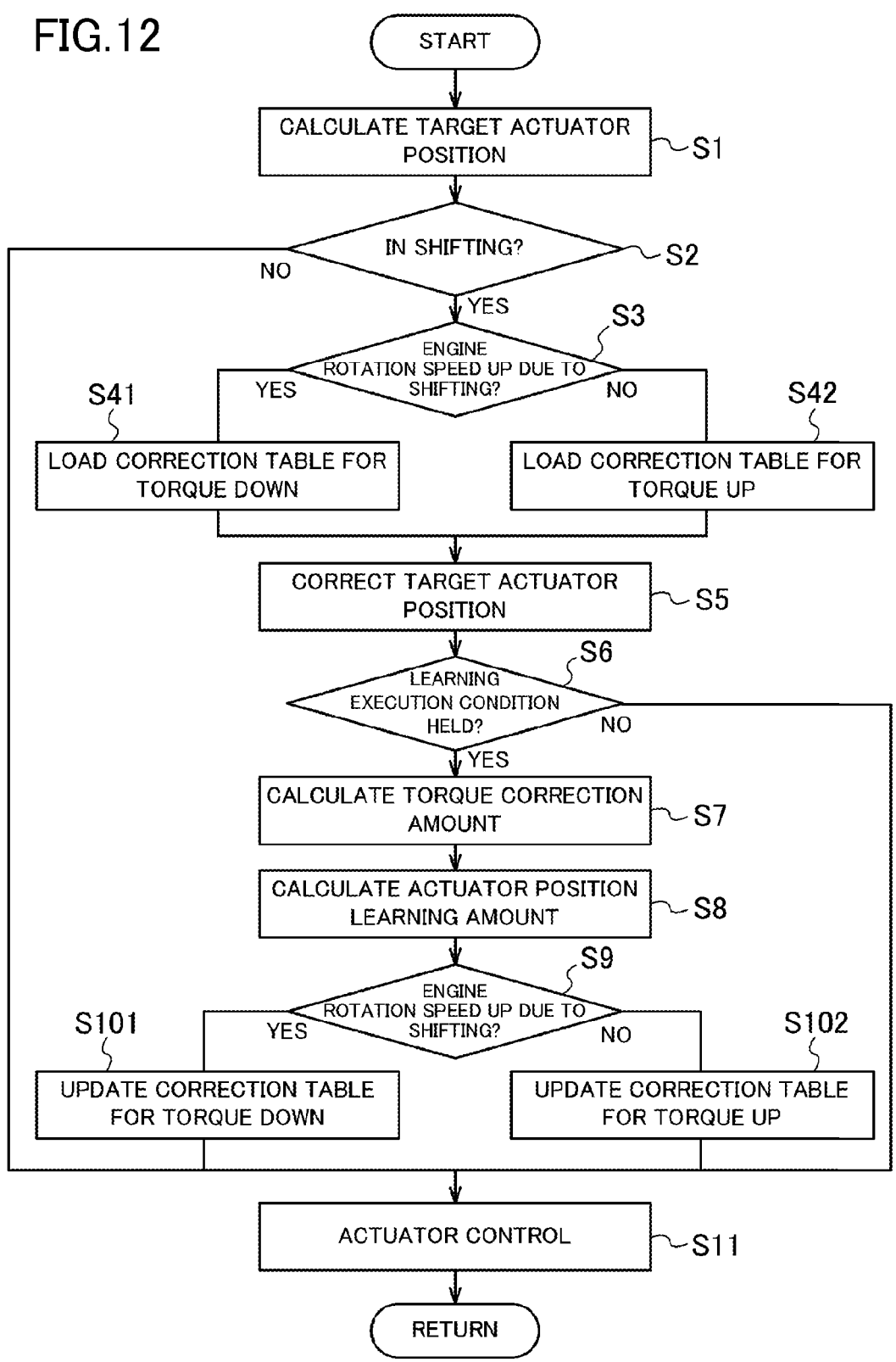
FIG. 12 is a flowchart showing a first operation example of the control apparatus.

FIG. 12 is a flowchart showing a first operation example of the control apparatus 10. The processing shown in the flowchart is executed for every predetermined period of time. In this operation example, the table holding unit 51 holds a correction table 51b applied under a condition with the engine torque increasing and a correction table 51b applied under a condition with the engine torque decreasing. In this operation example, a condition with the engine torque increasing corresponds to the first control mode, and a condition with the engine torque decreasing corresponds to the fourth control mode.

At S1, the base value calculating unit 53a of the target actuator position deciding unit 53 calculates a base value of a target actuator position voltage. Specifically, the base value calculating unit 53a reads a base value of a target actuator position voltage corresponding to a target torque capacity from the base table 51a stored in the correction table update unit 59. A target torque capacity is determined in accordance with the control state of the control apparatus 10. For example, the target torque capacity is set to the maximum when shift control is not executed as the clutches 40A, 40B are in an engaged state. Meanwhile, the target torque capacity varies at respective phases while shift control is being executed, as described above.

At S2, the target actuator position deciding unit 53 determines whether or not shifting is being executed. When shifting is being executed (S2: YES), the target actuator position deciding unit 53 holds the read base value. Meanwhile, when shifting is not being executed (S2: NO), the target actuator position deciding unit 53 outputs the read base value to the actuator control unit 57 as a target actuator position voltage. At S11, the actuator control unit 57 drives the clutch actuators 49A, 49B, using the received target actuator position voltage.

At S3, the shift condition determining unit 55 determines whether the rotation speed of the engine increases or decreases in the shifting. Virtually, whether the engine torque is decreasing or increasing is determined at this step. That is, the engine torque is decreasing during a shift with the engine rotation speed increasing (down shifting), and the engine torque is increasing during a shift with the engine rotation speed decreasing (up shifting). Determination as to whether the shifting is a shift with the engine rotation speed increasing or decreasing is made by determining, for example, whether a shift down instruction or a shift up instruction is inputted from the shift switch 19f. Further, the determination may be made, based on an input from the gear position sensor 19b. For example, the determination can be made by determining whether or not a gear ratio before shifting is smaller than a gear ratio after shifting, or by determining whether or not a quotient of a gear ratio before shifting and a gear ratio after shifting is equal to or smaller than one, or the like.

During shifting with the engine rotation speed increasing (S3: YES), that is, in a case of the engine torque is decreasing, S41 is executed. That is, at S41, the correction value calculating unit 53b of the target actuator position deciding unit 53 reads a correction value for the target actuator position voltage corresponding to the target torque capacity from the correction table 51b applied under a condition with the engine torque decreasing.

Similarly, during shifting with the engine rotation speed decreasing (S3: NO), that is, in a case of the engine torque is increasing, S42 is executed. That is, at S42, the correction value calculating unit 53b of the target actuator position deciding unit 53 reads a correction value for the target actuator position voltage corresponding to the target torque capacity from the correction table 51b applied under a condition with the engine torque increasing.

At S5, the target actuator position deciding unit 53 corrects the target actuator position voltage. Specifically, the target actuator position deciding unit 53 outputs a value that is an addition of the read base value at S1 and the read correction value at S41 or S42 to the actuator control unit 57 as the target actuator position voltage.

At S6, the correction table update unit 59 determines whether or not a learning execution condition is and satisfied. A learning execution condition is and satisfied when the inertia phase ends. That is, when the inertia phase end condition described in S208 in FIG. 7 is satisfied, the learning execution condition is satisfied. Conditions such as whether the clutch actuators 49A, 49B operate normal, whether the clutch sensors 19c, 19d operate normal, or the like, may be additionally taken into consideration. Further, conditions such as whether the absolute value of the difference between the maximum value and the minimum value of the engine torque, an accelerator opening degree, a vehicle speed, and so forth, is equal to or smaller than a predetermined value, whether a back torque limiter is not operating, or the like, may be further additionally taken into consideration.

When the learning execution condition is satisfied (S6: YES), S7 is executed. Meanwhile, when the learning execution condition is not satisfied (S6: NO), S11 is executed. That is, at S11, the actuator control unit 57 drives the clutch actuators 49A, 49B, using the target actuator position voltage received from the target actuator position deciding unit 53. With the above, the target actuator position voltage that is corrected using the correction value read at S41 or S42 is used at the respective phases of the shift control.

Meanwhile, at S7, the correction table update unit 59 calculates a torque correction amount based on a result of the inertia phase. A result of the inertia phase refers to, for example, an actual value of the inertia phase duration. A torque correction amount is obtained using a ratio between the actual value and the target value of the inertia phase duration. The ratio indicates a relationship between a transmission torque capacity actually generated at the inertia phase and a target value of the transmission torque capacity (the target torque capacity). Specifically, a torque correction amount is obtained by an expression, for example, "inertia torque×(1−inertia phase duration target value/inertia phase duration actual value)". The inertia torque is a value calculated at S206 in FIG. 7. The inertia phase duration target value is the inertia phase duration (FIG. 8) used in the calculation of the inertia torque at S206 in FIG. 7. The inertia phase duration actual value is a period of time actually needed for the inertia phase. That is, a period of time from the start of the inertial phase at S207 to determination of the end at S206 in FIG. 7.

At S8, the correction table update unit 59 calculates a learning amount for a correction value for the target actuator position voltage in the correction table 51b based on the torque correction amount obtained at S7. Specifically, calculation of a learning amount is executed as follows, for example. That is, initially, the correction table update unit 59 reads from the base table 51a a base value of a target actuator position voltage corresponding to a value that is an addition of the inertia torque and the torque correction amount. Then, the correction table update unit 59 calculates the difference between this base value and the base value of the target actuator position voltage read at S1 from the base table 51a. Thereafter, the correction table update unit 59 multiplies a predetermined weight coefficient to the difference to determine the value as a learning amount.

At S9, the shift condition determining unit 55 determines whether the current shifting is a shifting with the engine rotation speed increasing or decreasing. S9 is similar to S3 mentioned above.

During shifting with the engine rotation speed increasing (S9: YES), that is, in a case of the engine torque is decreasing, S101 is executed. That is, at S101, the correction table update unit 59 updates the correction value in the correction table 51b applied under a condition with the engine torque decreasing using the learning amount calculated at S8. Specifically, the correction table update unit 59 adds the correction value read at S41 and the learning amount calculated at S8, and overwrites the obtained added value on the position where the correction value read at S41 is written in the correction table 51b. Further, the correction table update unit 59 replaces the correction value stored in the target actuator position deciding unit 53 by that added value.

Similarly, during shifting with the engine rotation speed decreasing (S9: NO), that is, in a case of the engine torque is increasing, S102 is executed. That is, at S102, the correction table update unit 59 updates the correction value in the correction table 51b applied under a condition with the engine torque increasing using the learning amount calculated at S8. Specifically, the correction table update unit 59 adds the correction value read at S42 and the learning amount calculated at S8, and overwrites the added value on the position where the correction value read at S42 is written in the correction table 51b. Further, the correction table update unit 59 replaces the correction value stored in the target actuator position deciding unit 53 by that added value.

At S11, the actuator control unit 57 drives the clutch actuators 49A, 49B, using the target actuator position voltage received from the target actuator position deciding unit 53.

With the above, the first operation example is finished. As described above, as a different correction table 51b for using and updating a correction value for the target actuator position voltage is used between cases of conditions with the engine torque decreasing and increasing, respectively, it is possible to improve accuracy in learning for the correction value.

Second Operation Example

Figure 13:
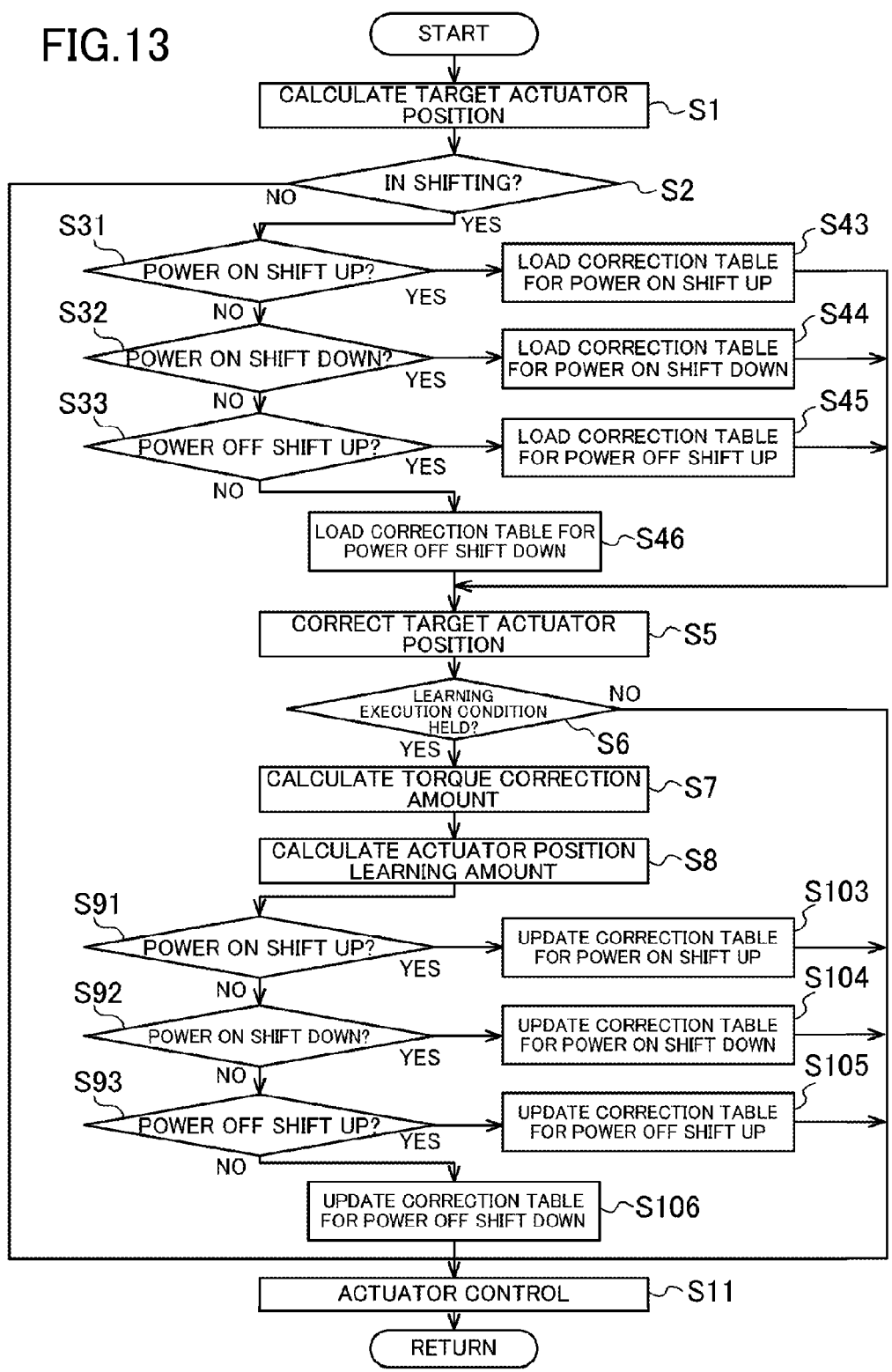
FIG. 13 is a flowchart showing a second operation example of the control apparatus.

FIG. 13 is a flowchart showing a second operation example of the control apparatus 10. In the following, a step same as that in the first operation example is given the same reference numeral, and is not described in detail. In this operation example, four kinds of correction tables 51b applied in the first control mode (power on shift up control), the second control mode (power on shift down control), the third control mode (power off shift up control), and the fourth control mode (power off shift down control), respectively, are stored in the table holding unit 51.

Of the first to fourth control modes, the first and second control modes are executed under a condition with the engine torque increasing, while the third and fourth control modes are executed under a condition with the engine torque decreasing. Further, as described above, the torque phase and the inertia phase are executed in this order at the first and fourth respective control modes, while the inertia phase and the torque phase are executed in this order at the second and third respective control modes, in which the clutches 40A, 40B are operated differently between the former two modes and the latter two modes.

At S31, the shift condition determining unit 55 determines whether or not the ongoing shifting is in the first control mode (power on shift up control). When the shifting is in the first control mode (S31: YES), S43 is executed. At S43, the correction value calculating unit 53b of the target actuator position deciding unit 53 reads a correction value for a target actuator position voltage corresponding to the target torque capacity from the correction table 51b applied in the first control mode.

At S32, the shift condition determining unit 55 determines whether or not the ongoing shifting is in the second control mode (power on shift down control). When the shifting is in the second control mode (S32: YES), S44 is executed. At S44, the correction value calculating unit 53b of the target actuator position deciding unit 53 reads a correction value for a target actuator position voltage corresponding to the target torque capacity from the correction table 51b applied in the second control mode.

At S33, the shift condition determining unit 55 determines whether or not the ongoing shifting is in the third control mode (power off shift up control). When the shifting is in the third control mode (S33: YES), S45 is executed. At S45, the correction value calculating unit 53b of the target actuator position deciding unit 53 reads a correction value for a target actuator position voltage corresponding to the target torque capacity from the correction table 51b applied in the third control mode.

When the ongoing shifting is not in either of the first to third control modes (S31 to S33: NO), that is, in the fourth control mode (power off shift down control), S46 is executed. At S46, the correction value calculating unit 53b of the target actuator position deciding unit 53 reads a correction value for a target actuator position voltage corresponding to the target torque capacity from the correction table 51b applied in the fourth control mode.

At S5, the target actuator position deciding unit 53 outputs a value that is an addition of the base value read at S1 and the correction value read at any of S43 to S46 to the actuator control unit 57 as the target actuator position voltage.

At S91 to S93, the shift condition determining unit 55 determines whether or not the ongoing shifting is in any of the first to fourth control modes. S91 to S93 are similar to S31 to S33. At S103 to S106, the correction table update unit 59 updates the correction value in the correction table 51b which is applied in the respective control mode, using the learning amount calculated at S8.

According to the second operation example, modifying correction table 51b which uses and updates a correction value for the target actuator position voltage in the respective first to fourth control modes makes it possible to improve accuracy of learning for the correction value.

Third Operation Example

Figure 14:
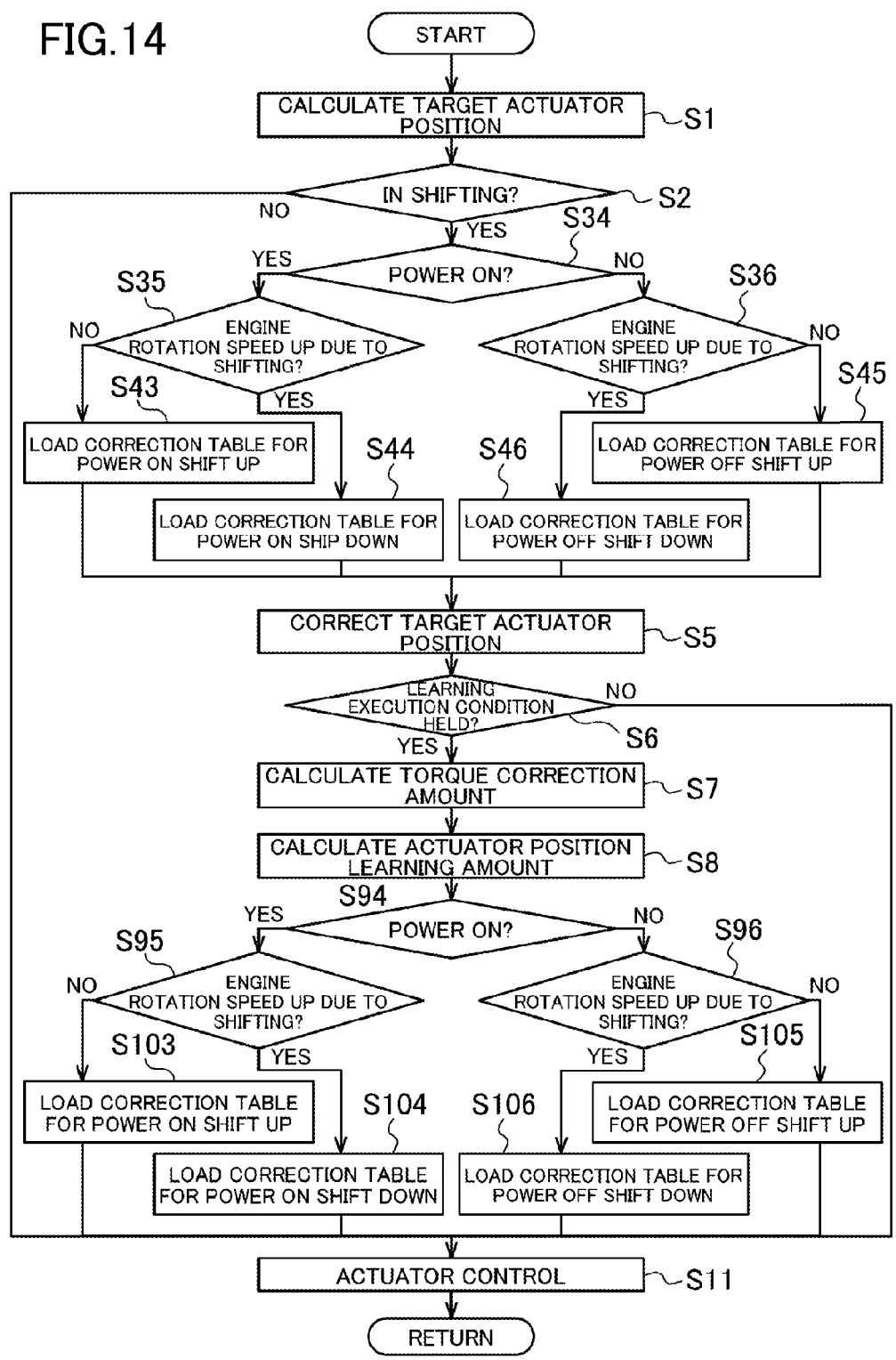
FIG. 14 is a flowchart showing a third operation example of the control apparatus.

FIG. 14 is a flowchart showing a third operation example of the control apparatus 10. In the following, a step same as that in the first or second operation example is given the same reference numeral, and is not described in detail. In this operation example, four kinds of correction tables 51b applied under the first to fourth respective control modes are stored in the table holding unit 51, similar to the second operation example.

At S34, the shift condition determining unit 55 determines whether the ongoing shifting is shifting with the accelerator in an open state (power on) or in a closed state (power off). Thereafter, at S35 or S36, the shift condition determining unit 55 determines whether the ongoing shifting is with the engine rotation speed increasing or decreasing. With S34 to S36, in which the control mode of the first to fourth control modes the ongoing shifting is determined. At S94 to S96, as well as S34 to S36, the shift condition determining unit 55 determines in which control mode of the first to fourth control modes the ongoing shifting is.

In the third operation example, similar to the above described second operation example, modifying correction table 51b which uses and updates a correction value for the target actuator position voltage in the respective first to fourth control modes makes it possible to improve accuracy of learning for the correction value.

First Modified Example

Figure 15:
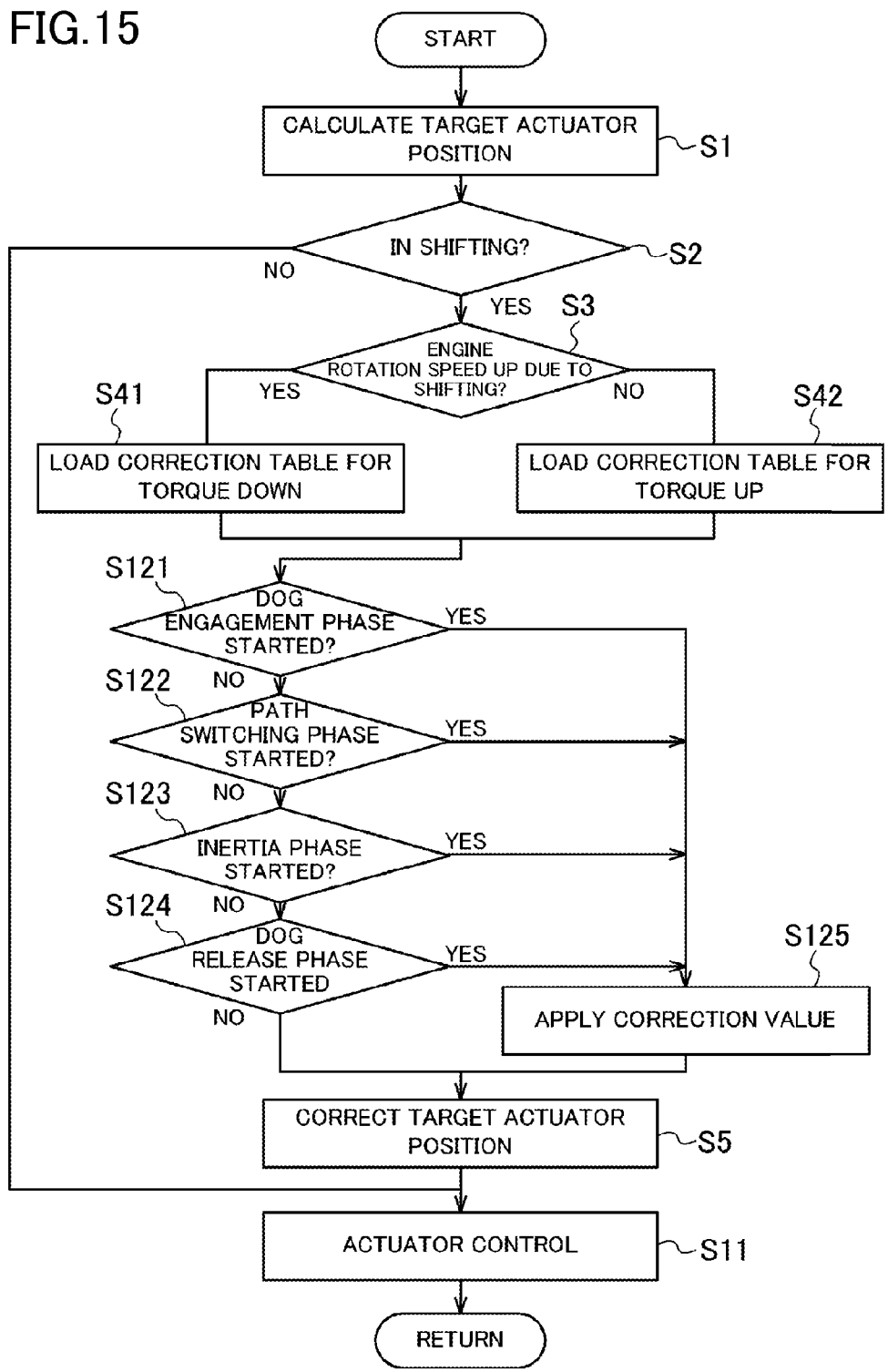
FIG. 15 is a flowchart showing a first modified example of a preferred embodiment of the present invention.

In the following, a first modified example of the above described preferred embodiment will be described. FIG. 15 is a flowchart showing a first modified example. In the following, a step same as that in the first operation example is given the same reference numeral, and is not described in detail. In the drawing, S6 to S9, S101, S102 shown in the flowchart are omitted in FIG. 12.

At S121 to S124, the shift condition determining unit 55 determines whether or not any of the dog engagement phase, the torque phase, the inertia phase, and the dog release phase included in the shift control has been started. Start of the dog engagement phase is determined by determining, for example, whether or not shift control is started, whether a dog engagement instruction is output, or the like. Start of the dog release phase is determined by determining, for example, whether a dog release instruction is output, or the like.

Start of the torque phase is determined, for example, upon detection of dog engagement, detection of an instruction to change the prior clutch Cp to a released state, or the like, in the first control mode (power on shift up control) or the fourth control mode (power off shift down control). Further, it is detected upon reaching of the engine rotation speed to the target value at the inertia phase, upon detection of an instruction to change the prior clutch Cp to a released state, or the like, in the second control mode (power on shift down control) or the third control mode (power off shift up control).

Start of the inertia phase is determined by determining, for example, whether an inertia torque is set, or the like. Further, start of the inertial phase is determined, for example, upon the prior clutch Cp reaching a released state, or the like in the first control mode (power on shift up control) or the fourth control mode (power off shift down control). Further, it is determined, for example, upon detection of dog engagement, or the like, in the second control mode (power on shift down control) or the third control mode (power off shift up control).

When start of any of the dog engagement phase, the torque phase, the inertia phase, and the dog release phase is determined (S121 to S124: YES), S5 is executed after S125. That is, the target actuator position deciding unit 53 corrects the target actuator position voltage using the correction value read at S41 or S42.

Meanwhile, when start of any of the dog engagement phase, the torque phase, the inertia phase, and the dog release phase is not determined (S121 to S124: NO), S5 is executed without S125. That is, the target actuator position deciding unit 53 corrects the target actuator position voltage using the correction value stored before, not the correction value read at S41 or S42.

According to the above described processes, the base value of the target actuator position voltage read at S1 is updated for every update of the target torque capacity during a period in which shift control is executed. Meanwhile, the correction value for the target actuator position voltage read at S41 or S42 is updated at the start of each of the dog engagement phase, the torque phase, the inertia phase, and the dog release phase, and is continuously applied, without being updated, during a period in which the phase is executed. With the above, even when the correction values in the correction table 51b varies, it is possible to prevent discontinuous change of the clutch capacity may generate in the clutch 40A, 40B while each phase is being executed.

Second Modified Example

Figure 16:
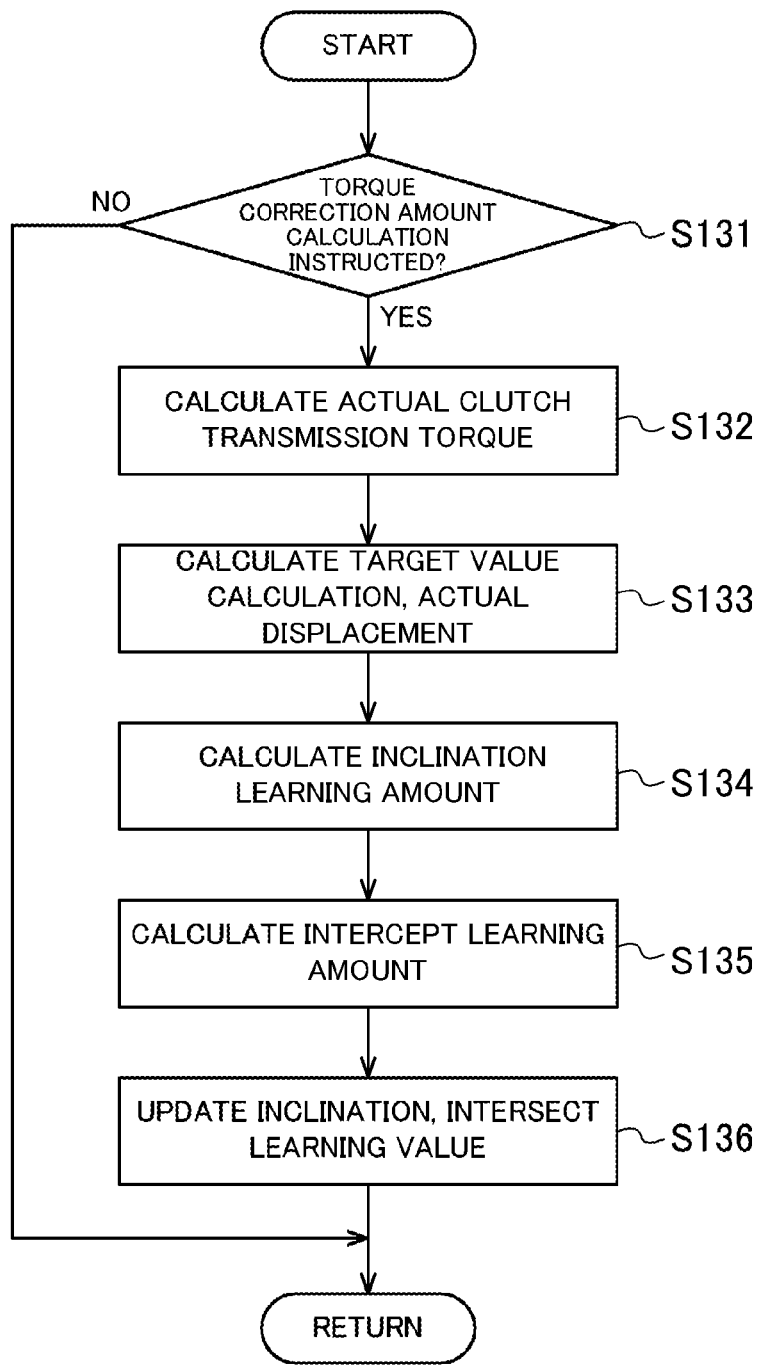
FIG. 16 is a flowchart showing a second modified example of a preferred embodiment of the present invention.

In the following, a second modified example of the above described preferred embodiment will be described. FIG. 16 is a flowchart showing a second modified example. The processing shown in the flowchart in the drawing is executed at S7 in the flowchart shown in FIGS. 12 to 14. In this example, a target value table and a displaced amount table are stored in the table holding unit 51.

Figures 17A, 17B, 18A:
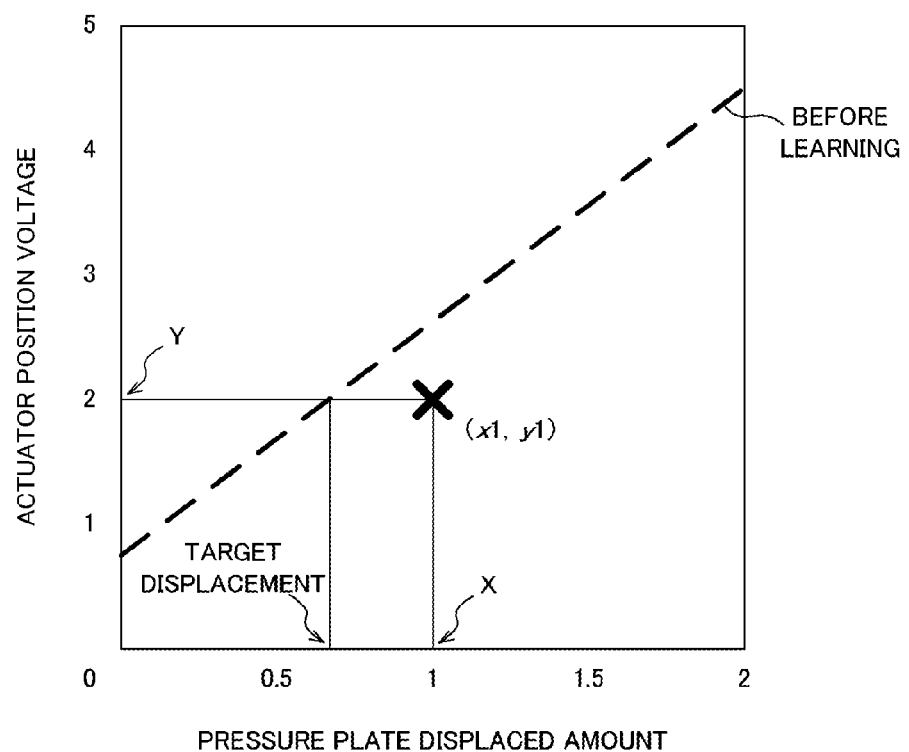
FIG. 17A shows an example of the content of a target value table.
FIG. 17B shows an example of the content of a displaced amount table.
FIG. 18A explains a second modified example of a preferred embodiment of the present invention.

The target value table shows a relationship between a transmission torque capacity (a target torque capacity) to be generated in the clutch 40A, 40B and a target actuator position voltage to be provided to the clutch actuator 49A, 49B. FIG. 17A shows an example of the content of the target value table. The target value table is the same as the base table 51a. The displaced amount table shows a relationship between a target torque capacity and a displaced amount of the pressure plate 43 included in the clutch 40A, 40B (see FIG. 2). FIG. 17B shows an example of the content of the displaced amount table.

At S131, the correction table update unit 59 determines whether or not a calculation instruction for the torque correction amount is made. This corresponds to S7 in the flowcharts shown in FIGS. 12 to 14.

At S132, the correction table update unit 59 calculates the transmission torque capacity that is generated in the clutch 40A, 40B during the inertia phase period (hereinafter referred to as an actual clutch transmission torque). The actual clutch transmission torque Tc is obtained as, for example, the average of Tc expressed by the expression "Tc=Te×primary reduction ratio−J×dNe/dt" during the initial phase period, in which Te indicates the inertia torque, J indicates the inertia of the engine 20, and Ne indicates the engine rotation speed. Alternatively, the actual clutch transmission torque may be obtained by, for example, an expression "target torque capacity−inertia torque×inertia phase duration target value/inertia phase duration target value". Note that the target torque capacity and the inertia torque are of the values at the start of the inertial phase.

At S133, the correction table update unit 59 reads an actuator position voltage (hereinafter referred to as a target voltage) corresponding to the target torque capacity from the target value table shown in FIG. 17A. The target voltage corresponds to Y in the graph shown in FIG. 18A. Further, the correction table update unit 59 reads a pressure plate displaced amount (hereinafter referred to as an actual displacement) corresponding to the actual clutch transmission torque from the displaced amount table shown in FIG. 17B. This actual displacement corresponds to X in the graph shown in FIG. 18A. The mark x in FIG. 18A indicates a point indicating the actual displacement and the target voltage. The coordinates of the point is defined as (x1, y1). The broken line in FIG. 18A indicates a relationship between the pressure plate displaced amount before learning and the actuator position voltage. In this example, it is assumed that the actuator position voltage and the pressure plate displaced amount have a linear and unique relationship.

Figure 18B:
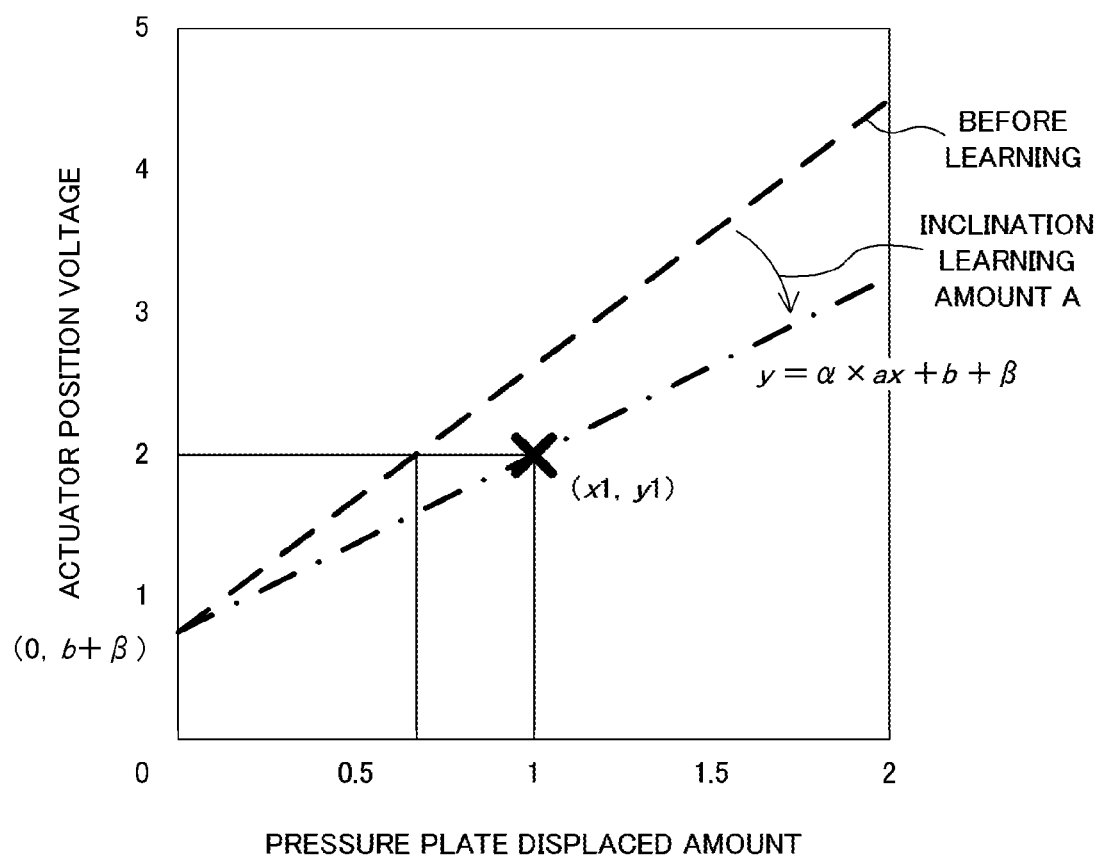
FIG. 18B explains the second modified example of a preferred embodiment of the present invention.

At S134, the correction table update unit 59 calculates inclination of the straight line passing through an intercept before learning (0, b+β) and the point (x1, y1) indicating the target voltage and the actual displacement as an inclination learning amount A (see FIG. 18B). This straight line is indicated by the alternate long and short dash line in FIG. 18B. The inclination learning amount A is expressed by an expression $((b+\beta-y1)/x1)/a$. Note here, a indicates a designed value of the inclination, b indicates a designed value of the intercept, α indicates a previous correction value for the inclination, and β indicates a previous correction value for the intercept.

Figure 18C:
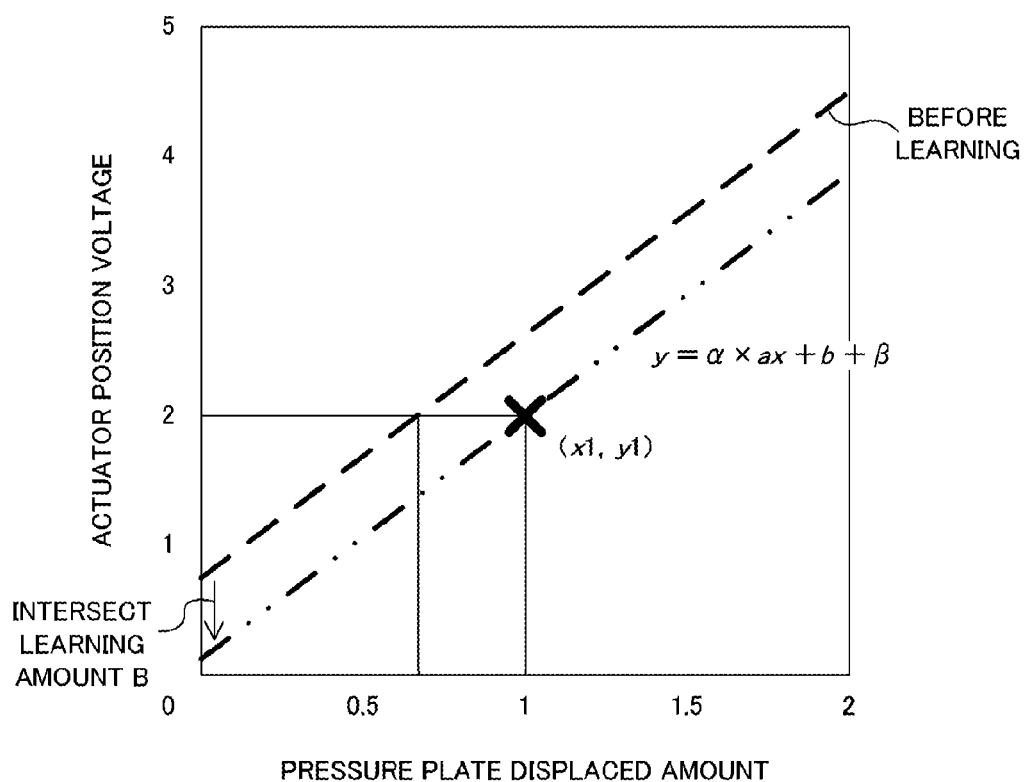
FIG. 18C explains the second modified example of a preferred embodiment of the present invention.

At S135, the correction table update unit 59 calculates an intercept of the straight line passing through the point (x1, y1) indicating the target voltage and the actual displacement at an inclination before learning $\alpha \times a$ as an intercept learning amount B (see FIG. 18C). The straight line is indicated by the long dashed double-short dashed line in FIG. 18C.

Figure 18D:
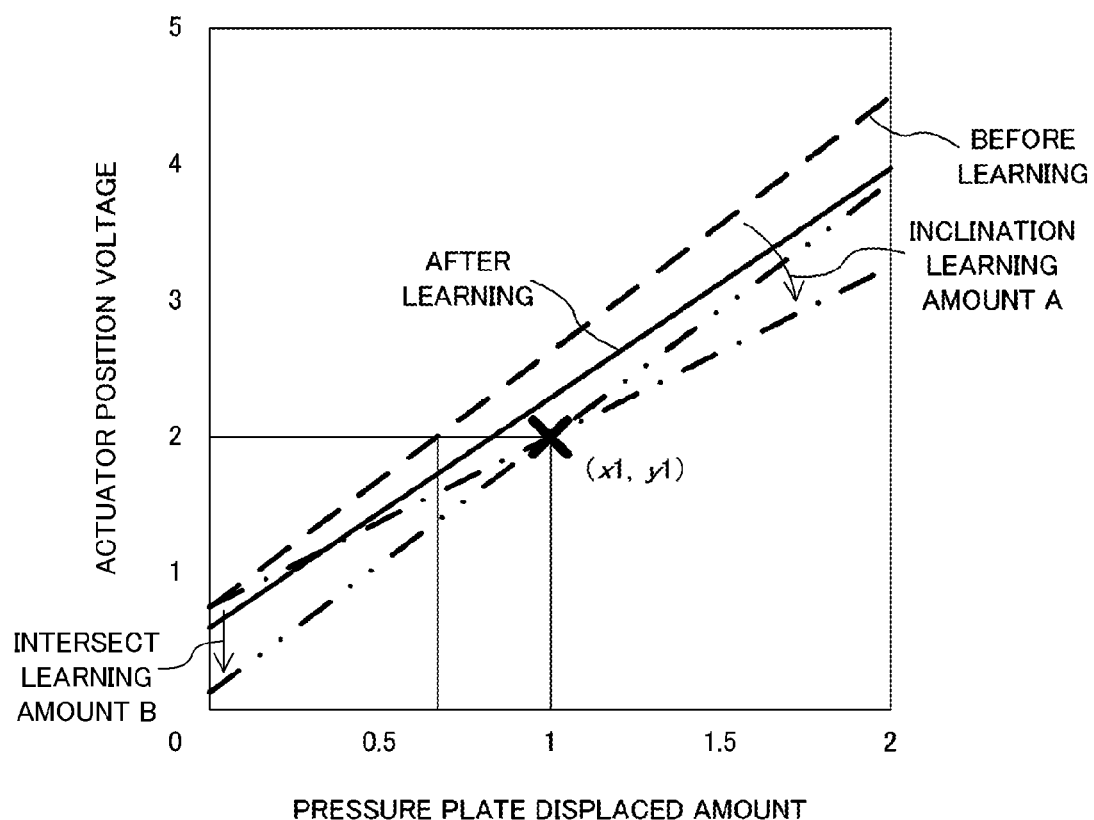
FIG. 18D explains the second modified example of a preferred embodiment of the present invention.

At S136, the correction table update unit 59 updates the correction value α for the inclination and the correction value β for the intercept. For the updating, for example, the calculated inclination learning amount A and the intercept learning amount B may be used intact as the correction value α for the inclination and the correction value β for the intercept, respectively, or a predetermined filter value may be used. When a filter value is used, for example, the correction value $\alpha_i$ for the inclination is obtained by an expression $A \times 1/Wa + \alpha_{i-1} \times (Wa-1)/Wa$, and the correction value $\beta_i$ for the intercept is obtained by an expression $B \times 1/Wb + \beta_{i-1} \times (Wb-1)/Wb$. The straight line in a case of using filter values Wa, Wb is indicated by the solid line in FIG. 18D. The filter values Wa, Wb may be fixed values or vary depending on the oil temperature.

As described above, by updating the correction value α for the inclination of the line indicating a relationship between the pressure plate displaced amount and the actuator position voltage and the correction value β for the intercept, it is possible to correct the whole relationship between the pressure plate displaced amount and the actuator position voltage, based on one point (x1, y1) indicating the actual displacement and the target voltage.

Note that although a relationship between the actuator position voltage and the pressure plate displaced amount preferably is used in this example, this is not limiting, and a load or an oil pressure to transmit a drive force to the clutch 40A, 40B, for example, may be used instead of the pressure plate displaced amount. As a load, for example, a load caused by a pull/push rod or a load obtained based on reacting force caused by the distortion of a clutch cover case may be used.

The processing relevant to this example may be applied only in the first control mode (power on shift up control). This is because, in the third and fourth control modes which are in the power-off, in which an engine torque is applied in a relatively small range, correcting the whole relationship between the pressure plate displaced amount and the actuator position voltage using a value obtained from this range may possibly cause a discrepancy in a range of the relatively large engine torque. Moreover, correcting the whole relationship between the pressure plate displaced amount and the actuator position voltage with the value of the second control mode which is not frequently applied, may possibly cause a large discrepancy relative to the first control mode which is frequently applied.

Figure 19:
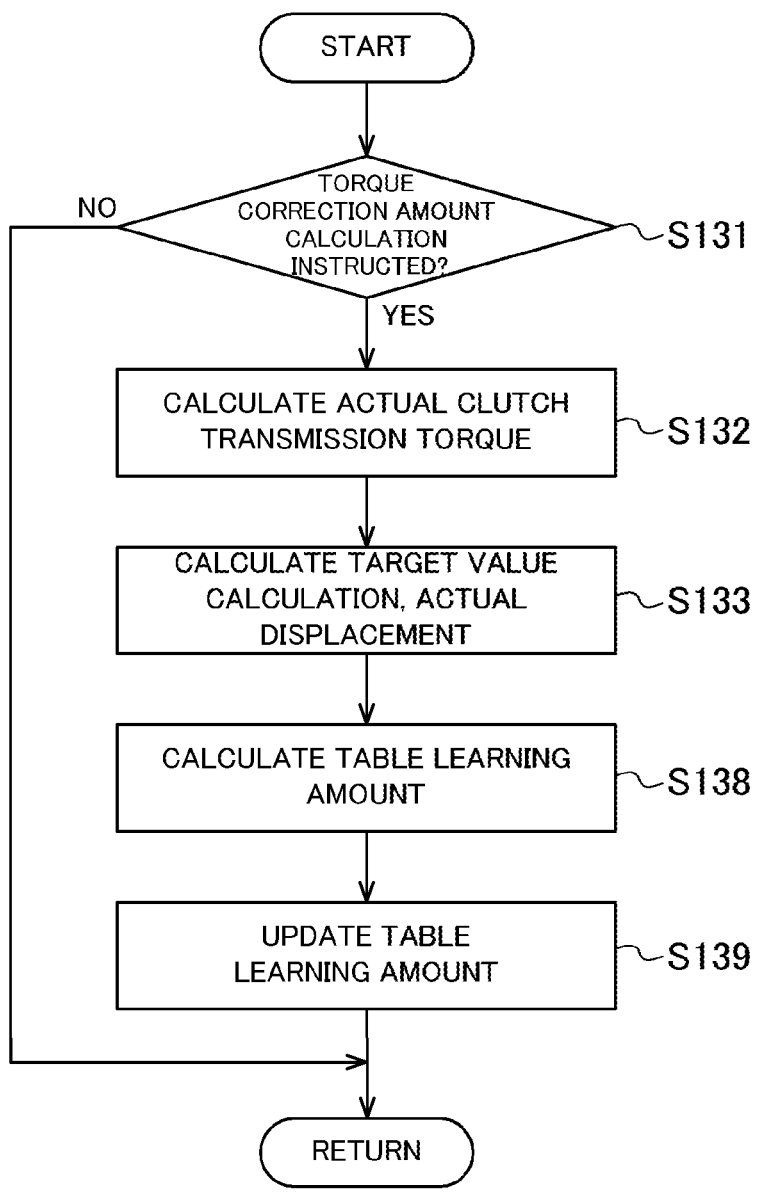
FIG. 19 is a flowchart relevant to a case in which the second modified example is executed for every area.
Figure 20:
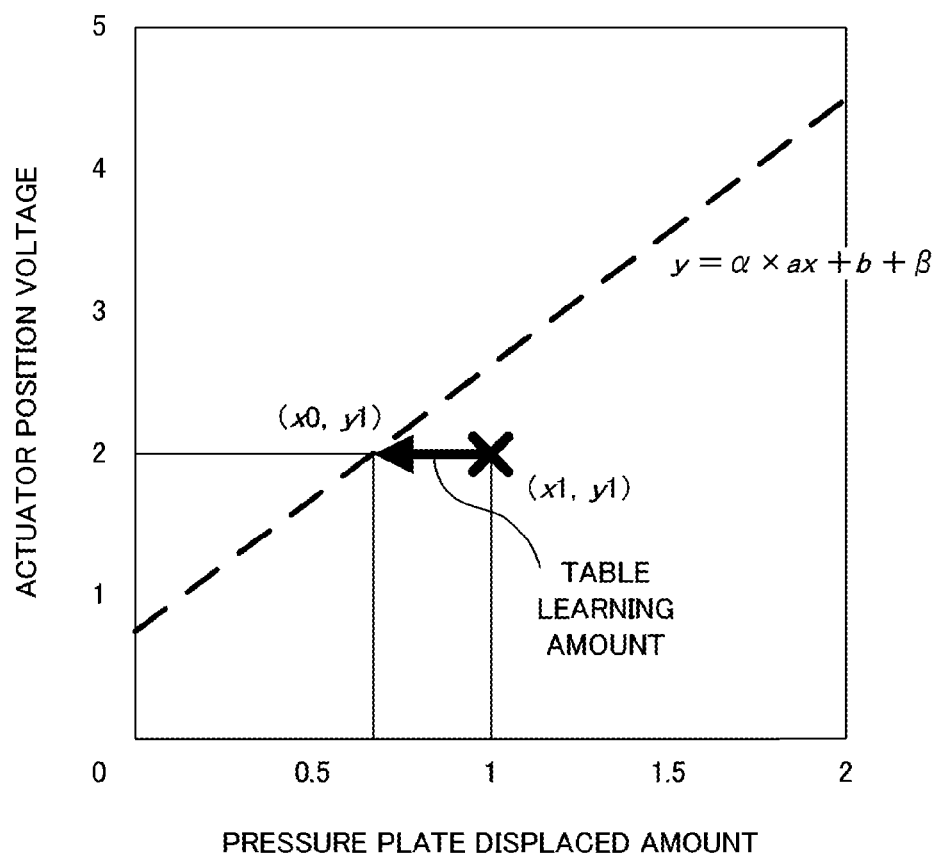
FIG. 20 explains the second modified example of a preferred embodiment of the present invention.

The processing relevant to this example may be executed for every range. FIG. 19 is a flowchart showing example processing for every range. S131 to S133 are similar to those in the flowchart in FIG. 16. At S138, the control apparatus 10 calculates a table learning amount. As shown in FIG. 20, the table learning amount Tblbas is expressed by an expression, for example, "actual displacement x1−target displacement x0", in which the target displacement x0 is expressed by an expression (y1−b−β)/(a×α) for example.

At S139, the control apparatus 10 updates a correction value with respect to a range including the target displacement x0. In the table shown in FIG. 21, a correction value is defined with respect to each range of the pressure plate displaced amount. The control apparatus 10 reads the previous correction value $Tbl_{i-1}$ with respect to the range including the target displacement x0 from the table, and obtains a correction value $Tbl_i$, based on the previous correction value read and the table learning amount Tblbas calculated at S138. The correction value $Tbl_i$ is obtained by an expression Tbli=(Tblbas+$Tbl_{i-1}$)×1/Wtbl+$Tbl_{i-1}$×(Wtbl−1)/Wtbl, for example, in which Wtbl indicates a filter value.

Update of the table learning value may be made not only with respect to the range alone including the target displacement x0 but also to a range therearound together. The correction value $Tbl_i$ is obtained by, for example, an expression "$Tbl_i$ (K+n)=(Tblbas+$Tbl_{i-1}$ (K+n))×1/Wtbl (n)+$Tbl_{i-1}$ (K+n)×(Wtbl (n)−1)/W tbl", in which K indicates an index of a correction value corresponding to x0, and n is a value determined depending on a range subjected to update.

When the table learning value is greater than a predetermined value, the correction value may be updated with respect to all ranges, while when the table learning value is smaller than a predetermined value, the correction value may be updated with respect to only some ranges. A difference between a value obtained by multiplying a coefficient to the table learning value and the current correction value stored in the correction table 51b may be defined as a new correction value.

Although preferred embodiments of the present invention have been described in the above, the present invention is not limited to the above described preferred embodiments, and various modified preferred embodiments are possible for a person skilled in the art.

In the above described preferred embodiments, a relationship between the target torque capacity and the target actuator position voltage is shown in the base table 51a and the correction table 51b. This is not limiting, and other values corresponding to the target torque capacity may be used instead of the target torque capacity, for example. Other values corresponding to the target torque capacity may be, for example, an oil pressure to transmit a drive force to the clutch 40A, 40B, a load caused by a pull/push rod, a displaced amount of the pressure plate, and the like. A table showing a relationship between a slave cylinder displaced amount of the clutch 40A, 40B and a master cylinder displaced amount corresponding to the target actuator position voltage may be used.

In a case where the clutch 40A, 40B is a wet clutch, a plurality of correction tables 51b applied in accordance with the oil temperature may be stored in the table holding unit 51. For example, a correction table 51b for lower oil temperatures and a correction table 51b for higher oil temperatures are provided. Between cases of low oil temperatures and of high oil temperatures, different transmission torque capacities may be actually generated in the clutch 40A, 40B even though the same instruction value is provided to the clutch 40A, 40B. In view of the above, modifying a correction table 51b for using and updating a correction value of the target actuator position voltage depending on the oil temperature makes it possible to minimize or prevent shift shock.

At the inertia phase at S207 in FIG. 7, feedback control may be executed to change the transmission torque capacity, depending on, for example, the difference between the target engine rotation speed and the actual engine rotation speed. In this case, the calculation of the torque correction amount at S7 in FIG. 12 is executed as described below. That is, initially, the control apparatus 10 calculates the actual clutch transmission torque at the end of the inertial phase, similar to the calculation of the actual clutch transmission torque at 5132 in FIG. 16. Then, the control apparatus 10 calculates the torque correction amount using the difference or ratio between the actual clutch transmission torque and the target torque capacity at the start of the inertia phase. Thereafter, the control apparatus 10 calculates a correction amount for a correction value for the target actuator position voltage stored in the correction table 51b based on the obtained torque correction amount.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A control apparatus configured to be mounted on a vehicle, the control apparatus including, on a path configured to transmit a torque output from an engine, a clutch of which a torque capacity changes in accordance with an operation of an actuator, and a dog clutch transmission mechanism mounted downstream of the clutch, the control apparatus being configured and programmed to execute rotation control to change a rotation speed of the engine during a gear change period by providing an instruction value to the actuator such that the torque capacity of the clutch becomes greater or smaller relative to the torque output from the engine, the control apparatus comprising:
 a holding unit configured and programmed to store condition-specific information indicating a relationship between the torque capacity and the instruction value to be provided to the actuator, and to be applied under each of a plurality of driving conditions that lead to different torque capacities generated in the clutch despite a same instruction value is provided to the actuator, or a plurality of driving conditions that lead to different characteristics during a change of the rotation speed of the engine despite a same torque capacity is generated in the clutch;
 a determining unit configured and programmed to determine under which driving condition among the plurality of driving conditions a gear change is executed;
 a deciding unit configured and programmed to decide an instruction value to be provided to the actuator corresponding to a target value of the torque capacity based on the condition-specific information that is applied under the determined driving condition;

a control unit configured and programmed to change the rotation speed of the engine by providing the decided instruction value to the actuator; and an update unit configured and programmed to update the condition-specific information that is applied under the determined driving condition based on information indicating a relationship between a target value and an actual value of the torque capacity that is generated during a period in which the rotation speed of the engine is changed.

2. The control apparatus according to claim 1, wherein the holding unit is configured and programmed to store condition-specific information that is applied while the torque output from the engine is increasing and condition-specific information that is applied while the torque output from the engine is decreasing.

3. A control apparatus configured to be mounted on a vehicle, the control apparatus including, on paths configured to transmit a torque output from an engine, two clutches of which respective torque capacities change in accordance with operations of actuators, to respectively receive the torque output, and two dog clutch transmission mechanisms including a common output shaft and mounted downstream of the respective clutches, the control apparatus being configured and programmed to execute during a gear change period switching control to switch the paths to transmit the torque from one of the two clutches and two transmission mechanisms to another of the two clutches and two transmission mechanisms, and rotation control to change a rotation speed of the engine by providing an instruction value to the actuators such that the torque capacities of the two clutches become greater or smaller relative to the torque output from the engine, the control apparatus comprising:

a holding unit configured and programmed to store condition-specific information indicating a relationship between the torque capacity and the instruction value to be provided to the actuators, to be applied under each of four driving conditions that are determined based on whether the rotation speed of the engine increases or decreases during the gear change, and whether the switching control is executed before or after the rotation control in the gear change;

a determining unit configured and programmed to determine under which driving condition among the four driving conditions the gear change is executed;

a deciding unit configured and programmed to decide an instruction value to be provided to the actuators corresponding to a target value of the torque capacity based on the condition-specific information that is applied under the determined driving condition;

a control unit configured and programmed to change the rotation speed of the engine by providing the decided instruction value to the actuators; and an update unit configured and programmed to update the condition-specific information that is applied under the determined driving condition based on information indicating a relationship between a target value and an actual value of the torque capacity that is generated during a period in which the rotation speed of the engine is changed.

4. The control apparatus according to claim 1, wherein the update unit is configured and programmed to calculate a correction amount for the instruction value to be provided to the actuator corresponding to the target value of the torque capacity based on a ratio between an actual value and a target value of a duration of the period in which the rotation speed of the engine is changed.

5. The control apparatus according to claim 1, wherein the update unit is configured and programmed to calculate the actual value of the torque capacity that is generated during the period in which the rotation speed of the engine is changed, and calculate a correction amount for the instruction value to be provided to the actuator corresponding to the target value of the torque capacity based on a ratio between the actual value and the target value of the torque capacity.

6. The control apparatus according to claim 1, wherein the holding unit is configured and programmed to hold:

a base table showing a relationship between the torque capacity and a base value of the instruction value to be provided to the actuator; and a plurality of correction tables showing a relationship, as the condition-specific information that is applied under each of the driving conditions, between the torque capacity and a correction value for the instruction value to be provided to the actuator.

7. The control apparatus according to claim 6, wherein the base value of the instruction value to be provided to the actuator corresponding to the target value of the torque capacity is updated and applied for every update of the target value of the torque capacity during a period in which the rotation control is executed; and a correction value of the instruction value to be provided to the actuator corresponding to the target value of the torque capacity is updated at a start of the rotation control, and is continuously applied during the period in which the rotation control is executed.

8. The control apparatus according to claim 1, wherein the holding unit is configured and programmed to store displaced amount information indicating a relationship between the torque capacity and a value indicating a displaced amount of a pressure plate included in the clutch, and the update unit is configured and programmed to:

calculate the instruction value to be provided to the actuator corresponding to the target value of the torque capacity, based on the condition-specific information;

calculate a value indicating a displaced amount of the pressure plate corresponding to the actual value of the torque capacity based on the displaced amount information;

correct a function between the instruction value to be provided to the actuator and the value indicating the displaced amount of the pressure plate based on the calculated values, the function being determined based on the condition-specific information and the displaced amount information; and update the condition-specific information based on the corrected function.

9. A control apparatus configured to be mounted on a vehicle, the control apparatus including, on a path configured to transmit a torque output from an engine, a clutch of which torque capacity changes in accordance with an operation of an actuator, and a dog clutch transmission mechanism mounted downstream of the clutch, the control apparatus being programmed to execute rotation control to change a rotation speed of the engine in a gear change period by providing an instruction value to the actuator such that the torque capacity of the clutch becomes greater or smaller relative to the torque output from the engine, the control apparatus comprising:

a holding unit configured and programmed to store condition-specific information indicating a relationship between the torque capacity and the instruction value to be provided to the actuator, and to be applied under each of a plurality of driving conditions that lead to different torque capacities generated in the clutch despite a same instruction value is provided to the actuator, or a plurality of driving conditions that lead to different characteristics during a change of the rotation speed of the engine despite a same torque capacity is generated in the clutch;

a determining unit configured and programmed to determine under which driving condition among the plurality of driving conditions a gear change is executed;

a deciding unit configured and programmed to decide an instruction value to be provided to the actuator corresponding to a target value of the torque capacity based on the condition-specific information that is applied under the determined driving condition; and a control unit configured and programmed to change the rotation speed of the engine by providing the decided instruction value to the actuator.

10. A vehicle including a control apparatus mounted on the vehicle, the control apparatus including, on a path configured to transmit a torque output from an engine, a clutch of which a torque capacity changes in accordance with an operation of an actuator, and a dog clutch transmission mechanism mounted downstream of the clutch, the control apparatus being configured and programmed to execute rotation control to change a rotation speed of the engine during a gear change period by providing an instruction value to the actuator such that the torque capacity of the clutch becomes greater or smaller relative to the torque output from the engine, the control apparatus comprising:

a holding unit configured and programmed to store condition-specific information indicating a relationship between the torque capacity and the instruction value to be provided to the actuator, and to be applied under each of a plurality of driving conditions that lead to different torque capacities generated in the clutch despite a same instruction value is provided to the actuator, or a plurality of driving conditions that lead to different characteristics during a change of the rotation speed of the engine despite a same torque capacity is generated in the clutch;

a determining unit configured and programmed to determine under which driving condition among the plurality of driving conditions a gear change is executed;

a deciding unit configured and programmed to decide an instruction value to be provided to the actuator corresponding to a target value of the torque capacity based on the condition-specific information that is applied under the determined driving condition;

a control unit configured and programmed to change the rotation speed of the engine by providing the decided instruction value to the actuator; and an update unit configured and programmed to update the condition-specific information that is applied under the determined driving condition based on information indicating a relationship between a target value and an actual value of the torque capacity that is generated during a period in which the rotation speed of the engine is changed.

11. A motor including a control apparatus, the control apparatus including, on a path configured to transmit a torque output from the motor, a clutch of which a torque capacity changes in accordance with an operation of an actuator, and a dog clutch transmission mechanism mounted downstream of the clutch, the control apparatus being configured and programmed to execute rotation control to change a rotation speed of the motor during a gear change period by providing an instruction value to the actuator such that the torque capacity of the clutch becomes greater or smaller relative to the torque output from the motor, the control apparatus comprising:

a holding unit configured and programmed to store condition-specific information indicating a relationship between the torque capacity and the instruction value to be provided to the actuator, and to be applied under each of a plurality of driving conditions that lead to different torque capacities generated in the clutch despite a same instruction value is provided to the actuator, or a plurality of driving conditions that lead to different characteristics during a change of the rotation speed of the motor despite a same torque capacity is generated in the clutch;

a determining unit configured and programmed to determine under which driving condition among the plurality of driving conditions a gear change is executed;

a deciding unit configured and programmed to decide an instruction value to be provided to the actuator corresponding to a target value of the torque capacity based on the condition-specific information that is applied under the determined driving condition;

a control unit configured and programmed to change the rotation speed of the motor by providing the decided instruction value to the actuator; and an update unit configured and programmed to update the condition-specific information that is applied under the determined driving condition based on information indicating a relationship between a target value and an actual value of the torque capacity that is generated during a period in which the rotation speed of the motor is changed.

* * * * *